(12) United States Patent
Lord et al.

(10) Patent No.: US 9,599,481 B2
(45) Date of Patent: Mar. 21, 2017

(54) SYSTEM AND METHODS FOR IDENTIFYING ONE OR MORE TRANSPORTATION VEHICLE UNITS WITH OR WITHOUT PACKAGE DELIVERY OBLIGATION FOR TRANSPORTING ONE OR MORE END USERS

(71) Applicant: Elwha LLC, Bellevue, WA (US)

(72) Inventors: Richard T. Lord, Gig Harbor, WA (US); Robert W. Lord, Seattle, WA (US); Nathan P. Myhrvold, Medina, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/474,587

(22) Filed: Sep. 2, 2014

(65) Prior Publication Data

US 2015/0323332 A1 Nov. 12, 2015

Related U.S. Application Data

(63) Continuation-in-part of application No. 14/318,182, filed on Jun. 27, 2014, and a continuation-in-part of
(Continued)

(51) Int. Cl.
*G06F 19/00* (2011.01)
*G01C 21/34* (2006.01)
(Continued)

(52) U.S. Cl.
CPC .......... *G01C 21/34* (2013.01); *G01C 21/3438* (2013.01); *G06Q 10/083* (2013.01); *G06Q 50/30* (2013.01)

(58) Field of Classification Search
CPC .... G01C 21/3438; G01C 21/00; B65D 25/02; G06F 19/322; G06F 19/3418; G06K 19/0712; G06Q 50/30
(Continued)

(56) References Cited

U.S. PATENT DOCUMENTS 5,802,492 A 9/1998 DeLorme et al.
5,920,697 A 7/1999 Masters et al.
(Continued)

OTHER PUBLICATIONS

Vaughn-Nichols, Will Mobile Computing's Future Be Location, Location, Location?, 2009, IEEE, p. 14-17.*
(Continued)

*Primary Examiner* — McDieunel Marc

(57) ABSTRACT

Computationally implemented methods and systems that are designed for receiving a request for transporting one or more end users; identifying one or more transportation vehicle units for transporting the one or more end users to one or more destination locations based, at least in part, on determining whether the one or more transportation vehicle units have one or more delivery package obligations; and transmitting one or more directives that direct the one or more transportation vehicle units to rendezvous with the one or more end users in order to transport the one or more end users to the one or more destination locations. In addition to the foregoing, other aspects are described in the claims, drawings, and text.

42 Claims, 18 Drawing Sheets

Related U.S. Application Data application No. 14/329,451, filed on Jul. 11, 2014, which is a continuation of application No. 14/328,002, filed on Jul. 10, 2014, application No. 14/474,587, which is a continuation-in-part of application No. 14/456,627, filed on Aug. 11, 2014, which is a continuation of application No. 14/455,534, filed on Aug. 8, 2014.

(60) Provisional application No. 61/989,394, filed on May 6, 2014.

(51) Int. Cl.
*G06Q 50/30* (2012.01)
*G06Q 10/08* (2012.01)

(58) Field of Classification Search
USPC .............. 701/410; 705/330, 333; 340/10.1; 370/328; 455/456.1
See application file for complete search history.

(56) References Cited

U.S. PATENT DOCUMENTS

| | | | |
|---|---|---|---|
| 6,321,158 | B1 | 11/2001 | DeLorme et al. |
| 7,312,712 | B1 | 12/2007 | Worrall |
| 7,840,427 | B2 | 11/2010 | O'Sullivan |
| 7,957,871 | B1 | 6/2011 | Echeruo |
| 8,626,366 | B2 | 1/2014 | Noffsinger et al. |
| 8,688,532 | B2 | 4/2014 | Khunger et al. |
| 8,775,070 | B1 | 7/2014 | Bhatia |
| 8,831,677 | B2 | 9/2014 | Villa-Real |
| 2002/0186144 | A1 | 12/2002 | Meunier |
| 2003/0040944 | A1* | 2/2003 | Hileman .......... G06Q 10/02 705/5 |
| 2009/0005963 | A1 | 1/2009 | Jarvinen |
| 2009/0248587 | A1 | 10/2009 | Van Buskirk |
| 2010/0280884 | A1 | 11/2010 | Levine et al. |
| 2010/0332131 | A1 | 12/2010 | Horvitz et al. |
| 2011/0059693 | A1 | 3/2011 | O'Sullivan |
| 2011/0257883 | A1 | 10/2011 | Kuznetsov |
| 2011/0288762 | A1 | 11/2011 | Kuznetsov |
| 2012/0041675 | A1 | 2/2012 | Juliver et al. |
| 2012/0112696 | A1 | 5/2012 | Ikeda et al. |
| 2012/0253654 | A1 | 10/2012 | Sun et al. |
| 2013/0054139 | A1 | 2/2013 | Bodin et al. |
| 2013/0131909 | A1 | 5/2013 | Cooper et al. |
| 2013/0158861 | A1 | 6/2013 | Lerenc |
| 2013/0158869 | A1 | 6/2013 | Lerenc |
| 2013/0226365 | A1 | 8/2013 | Brozovich |
| 2014/0094998 | A1 | 4/2014 | Cooper et al. |
| 2014/0173511 | A1 | 6/2014 | Lehmann et al. |
| 2015/0006005 | A1 | 1/2015 | Yu et al. |
| 2015/0006072 | A1 | 1/2015 | Goldberg et al. |
| 2015/0019132 | A1 | 1/2015 | Gusikhin et al. |
| 2015/0025932 | A1 | 1/2015 | Ross et al. |
| 2015/0278759 | A1 | 10/2015 | Harris et al. |
| 2015/0294431 | A1 | 10/2015 | Fiorucci |
| 2015/0323333 | A1 | 11/2015 | Lord et al. |
| 2015/0323336 | A1 | 11/2015 | Lord et al. |
| 2015/0324717 | A1 | 11/2015 | Lord et al. |
| 2015/0324729 | A1 | 11/2015 | Lord et al. |
| 2015/0324735 | A1 | 11/2015 | Lord et al. |
| 2015/0324944 | A1 | 11/2015 | Lord et al. |
| 2015/0324945 | A1 | 11/2015 | Lord et al. |
| 2015/0325128 | A1 | 11/2015 | Lord et al. |

OTHER PUBLICATIONS

Dillenburg et al.; "The Intelligent Travel Assistant"; The IEEE 5$^{th}$ International conference on Intelligent Transportation Systems; Sep. 3-6, 2002; pp. 691-696; IEEE.

Guc et al.; "Real-time, Scalable Route Planning using a Stream-Processing Infrastructure"; 2010 13$^{th}$ International IEEE Annual Conference on Intelligent Transportation Systems; Sep. 19-22, 2010; pp. 986-991; IEEE.

Lalos et al.; "A Framework for dynamic car and taxi pools with the use of Positioning Systems"; 2009 Computation World: Future Computing, Service Computation, Cognitive, Adaptive, Content, Patterns; bearing a date of 2009; pp. 385-391; IEEE Computer Society.

Shahzada et al.; "Dynamic Vehicle Navigation: An A* Algorithm Based Approach Using Traffic and Road Information"; 2011 International Conference on Computer Applications and Industrial Electronics; bearing a date of 2011; pp. 514-518; IEEE.

Boufraied, Amine; "A Diagnostic Approach for Advanced Tracking of Commercial Vehcles With Time Window Constraints"; IEEE Transaction on Intelligent Transportation Systems; bearing a date of Sep. 2013; pp. 1470-1479; vol. 14, No. 3; IEEE.

Fougeres et al; "A Push Service for Carpooling"; bearing a date of 2012 (created on Dec. 8, 2015); IEEE; 2012 IEEE International Conference on Green Computing and Communications, Conference on Internet of Things, and Conference on Cyber, Physical and Social Computing; pp. 685-691; IEEE Computer Society.

Megalingam et al; "Automated Wireless Carpooling System for an Eco-Friendly Travel"; bearing a date of 2011 (created on Dec. 8, 2015); IEEE; pp. 325-329.

Vaughn-Nichols, Steven J.; "Will Mobile Computing's Future be Location, Location, Location?"; IEEE; bearing a date of Feb. 2009; pp. 14-17; IEEE Computer Society.

Amey et al.; "'Real-Time' Ridesharing—The Opportunities and Challenges of Utilizing Mobile Phone Technology to Improve Rideshare Services"; Paper submitted to the 2011 Transportation Research Board Annual Meeting; bearing a date of Aug. 1, 2010; pp. 1-17.

* cited by examiner

**202\* Transport Request Receiving Module**
- 302 End User Preference Data Receiving Module
- 304 End User Location Data Receiving Module
- 306 Passenger Data Receiving Module

FIG. 3A

**204\* Transportation Vehicle Unit Ascertaining Module**
- 308 Proximate Vicinity Transportation Vehicle Unit Determining Module
- 310 Non-Violating Transportation Vehicle Unit Determining Module
- 312 End User Preference Compliant Transportation Vehicle Unit Determining Module
- 314 End User Transport Requirement Compliant Determining Module
- 316 Driver Preference Compliant Determining Module

FIG. 3B

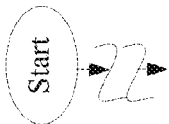 Start

504 Identifying one or more transportation vehicle units for transporting the one or more destination locations based, at least in part, on determining whether the one or more transportation vehicle units have one or more delivery package obligations 741 Identifying the one or more transportation vehicle units for transporting the one or more end users to the one or more destination locations based, at least in part, on ascertaining that the one or more transportation vehicle units have one or more package delivery obligations for delivering one or more packages that will not violate one or more requirements for transporting the one or more end users 745 Identifying the one or more transportation vehicle units for transporting the one or more end users to the one or more destination locations based, at least in part, on ascertaining that the one or more transportation vehicle units have one or more packages for delivery to one or more delivery locations that are along or proximate to a direct route to the one or more destination locations from a rendezvous location where the one or more end users rendezvous with the one or more transportation vehicle units in order to be transported to the one or more destination locations 746 Identifying the one or more transportation vehicle units for transporting the one or more end users to the one or more destination locations based, at least in part, on ascertaining that the one or more transportation vehicle units have one or more packages for delivery to one or more delivery locations that are along or proximate to a direct route that is the shortest distance route to the one or more destination locations from the rendezvous location 747 Identifying the one or more transportation vehicle units for transporting the one or more end users to the one or more destination locations based, at least in part, on ascertaining that the one or more transportation vehicle units have one or more packages for delivery to one or more delivery locations that are along or proximate to a direct route that is the most time efficient route to the one or more destination locations from the rendezvous location 748 Identifying the one or more transportation vehicle units for transporting the one or more end users to the one or more destination locations based, at least in part, on ascertaining that the one or more transportation vehicle units have one or more packages for delivery to one or more delivery locations that do not add more than a predefined amount of time to the total amount of time it would have taken to transport the one or more end users to the one or more destination locations using the direct route and when no packages are being delivered during the transport of the one or more end users to the one or more destination locations

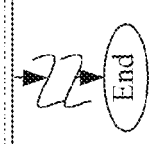 End

FIG. 7F

SYSTEM AND METHODS FOR IDENTIFYING ONE OR MORE TRANSPORTATION VEHICLE UNITS WITH OR WITHOUT PACKAGE DELIVERY OBLIGATION FOR TRANSPORTING ONE OR MORE END USERS

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application claims benefit of priority of U.S. Provisional Patent Application No. 61/989,394 titled RIDE-SHARING SCENARIOS, naming Richard T. Lord and Robert W. Lord as inventors, filed May 6, 2014, which was filed within the twelve months preceding the filing date of the present application or is an application of which a currently co-pending application is entitled to the benefit of the filing date.

The present application constitutes a continuation-in-part of U.S. patent application Ser. No. 14/318,182, entitled METHODS, SYSTEMS, AND DEVICES FOR PROVIDING TRANSPORTATION SERVICES, naming Richard T. Lord, Robert W. Lord, Nathan P. Myhrvold, and Clarence T. Tegreene, as inventors, filed 27 Jun. 2014.

The present application constitutes a continuation-in-part of U.S. patent application Ser. No. 14/329,451, entitled SYSTEMS AND METHODS FOR TRAVEL PLANNING THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 11 Jul. 2014, which is currently co-pending or is an application of which a currently co-pending application is entitled to the benefit of the filing date, and which is a continuation of U.S. patent application Ser. No. 14/328,002, entitled SYSTEMS AND METHODS FOR TRAVEL PLANNING THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 10 Jul. 2014.

The present application constitutes a continuation-in-part of U.S. patent application Ser. No. 14/456,627, entitled SYSTEM AND METHODS FOR PROVIDING AT LEAST A PORTION OF A TRAVEL PLAN THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 11 Aug. 2014, which is currently co-pending or is an application of which a currently co-pending application is entitled to the benefit of the filing date, and which is a continuation of U.S. patent application Ser. No. 14/455,534, entitled SYSTEM AND METHODS FOR PROVIDING AT LEAST A PORTION OF A TRAVEL PLAN THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 8 Aug. 2014.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, receiving a request for transporting one or more end users, identifying one or more transportation vehicle units for transporting the one or more end users to one or more destination locations based, at least in part, on determining whether the one or more transportation vehicle units have one or more delivery package obligations; and transmitting one or more directives that direct the one or more transportation vehicle units to rendezvous with the one or more end users in order to transport the one or more end users to the one or more destination locations. In various implementations, at least one of the facilitating or directing is performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for receiving a request for transporting one or more end users, means for identifying one or more transportation vehicle units for transporting the one or more end users to one or more destination locations based, at least in part, on determining whether the one or more transportation vehicle units have one or more delivery package obligations; and means for transmitting one or more directives that direct the one or more transportation vehicle units to rendezvous with the one or more end users in order to transport the one or more end users to the one or more destination locations. In addition to the foregoing, other system aspects are described in the claims, drawings, and text forming a part of the disclosure set forth herein.

In one or more various aspects, a system includes, but is not limited to, circuitry for receiving a request for transporting one or more end users, circuitry for identifying one or more transportation vehicle units for transporting the one or more end users to one or more destination locations based, at least in part, on determining whether the one or more transportation vehicle units have one or more delivery package obligations; and circuitry for transmitting one or more directives that direct the one or more transportation vehicle units to rendezvous with the one or more end users in order to transport the one or more end users to the one or more destination locations. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, receiving a request for transporting one or more end users, identifying one or more transportation vehicle units for transporting the one or more end users to one or more destination locations based, at least in part, on determining whether the one or more transportation vehicle units have one or more delivery package obligations; and transmitting one or more directives that direct the one or more transportation vehicle units to rendezvous with the one or more end users in order to transport the one or more end users to the one or more destination locations. In addition to the foregoing, other computer program product aspects are described in the claims, drawings, and text forming a part of the disclosure set forth herein.

In one or more various aspects, a system includes, but is not limited to a transportation vehicle unit ascertaining module configured to ascertain one or more transportation vehicle units for transporting one or more end users to one or more destination locations, the ascertainment being based, at least in part, on a determination as to whether or not the one or more transportation vehicle units have one or more delivery package obligations; and a directive transmitting module configured to transmit one or more directives that direct the one or more transportation vehicle units to rendezvous with the one or more end users at one or more rendezvous locations in order to transport the one or more end users to the one or more destination locations.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 3A shows another perspective of the transport request receiving module 202* of FIGS. 2A and 2B (e.g., the transport request receiving module 202' of FIG. 2A or the transport request receiving module 202" of FIG. 2B) in accordance with various embodiments.

FIG. 3B shows another perspective of the transportation vehicle unit ascertaining module 204* of FIGS. 2A and 2B (e.g., the transportation vehicle unit ascertaining module 204' of FIG. 2A or the transportation vehicle unit ascertaining module 204" of FIG. 2B) in accordance with various embodiments.

FIG. 7F is a high-level logic flowchart of a process depicting alternate implementations of the transportation vehicle unit identifying operation 504 of FIG. 5.

DETAILED DESCRIPTION

Figure 1:
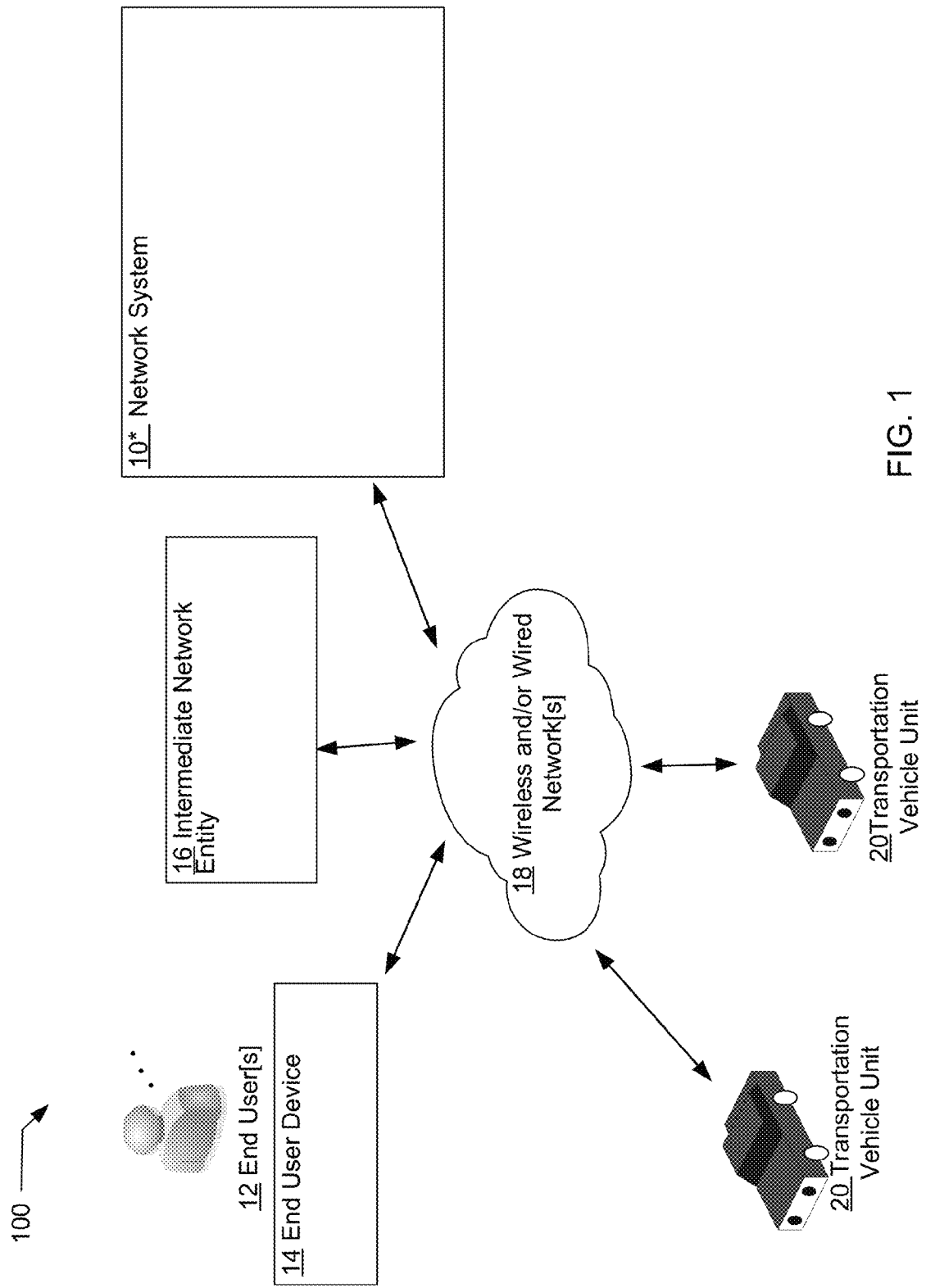
FIG. 1 illustrates a network system 10* operating in an exemplary environment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., WIKIPEDIA, High-level programming language, (as of Jun. 5, 2012, 21:00 GMT). In order to facilitate human comprehension, in many instances, high-level programming languages resemble or even share symbols with natural languages. See, e.g., WIKIPEDIA, (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., WIKIPEDIA, Logic gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., WIKIPEDIA, Computer architecture, (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., WIKIPEDIA, Instructions per second, (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and RACKSPACE). PaaS may include, e.g., one or more software and/or development tools hosted on an infrastructure (e.g., a computing platform and/or a solution stack from which the client can create software interfaces and applications, e.g., MICROSOFT AZURE). SaaS may include, e.g., software hosted by a service provider and accessible over a network (e.g., the software for the application and/or the data associated with that software application may be kept on the network, e.g., GOOGLE APPS, SALES FORCE). DaaS may include, e.g., providing desktop, applications, data, and/or services for the user over a network (e.g., providing a multi-application framework, the applications in the framework, the data associated with the applications, and/or services related to the applications and/or the data over the network, e.g., CITRIX). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

One of the newest trends in the field of transportation/commuting particularly in urban settings is the development of transportation networking services provided by web-based companies such as Uber and Lyft that allow users to retain drivers/vehicles for transportation serves through, for example, mobile applications. The increasingly popularity of such "ridesharing" services have already made some of the early entrants in this new field household names. As with many new technological ventures, the functionalities provided through such services are somewhat limited. However, there appears to be ample opportunities for adding new and value adding functionalities to such services (as well as to more traditional transportation services such as Taxi services) in order to provide more robust transportation networking systems.

Paralleling the rapidly increasing demand for ridesharing services is the explosive demand for door-to-door package delivery services that are partly as a result of increasing popularity of online retail services such as AMAZON, EBAY, and so forth. The demand for door-to-door package delivery services, however, can fluctuate wildly during the course of a typical year. For example, although demand for such services may be generally steady throughout the year, demand for such services will often explode during certain times of the year such as during the holiday season (e.g., Thanksgiving to New Year), Mother's day, and so forth. Although a few of the online retailers, such as AMAZON, are currently attempting to provide their own door-to-door package delivery services, most of door-to-door package delivery services are provided by a small group of relatively large parcel delivery companies (e.g., UPS, FEDEX, DSL, USPS, and so forth). Unfortunately, these parcel delivery companies have limited resources (e.g., delivery vehicles) and are sometimes unable to meet demand for door-to-door package delivery services particularly during peak seasons (e.g., holiday season).

In accordance with various embodiments, systems and methods that will allow for-hire passenger vehicles (herein "transportation vehicle units"), such as those provided by ridesharing or taxi services, to seamlessly transport passengers as well as to deliver packages—sometimes transporting passengers and delivering packages concurrently. In some cases, these systems and methods may be able to coordinate the matching of a transportation vehicle unit with one or more end users (e.g., passengers or customers) even when, for example, the transportation vehicle unit already has obligations to deliver packages. More particularly, the systems and methods may be designed to, among other things, identify one or more transportation vehicle units for transporting one or more end users to one or more destination locations based, at least in part, on determining whether the one or more transportation vehicle units have one or more delivery package obligations, and transmit one or more directives that direct the one or more transportation vehicle units to rendezvous with the one or more end users in order to transport the one or more end users to the one or more destination locations. For these embodiments, the systems and methods may coordinate transportation vehicle units to transport/deliver both end users (e.g., passengers) and packages (e.g., parcels not associated with the end users) without the obligations for delivering the packages interfering with the obligations for transporting the end users.

In some cases, in order for a transportation vehicle unit, such as those provided by ridesharing or taxi services, to deliver packages (e.g., parcels), it is envisioned that at least in some cases such a transportation vehicle unit (which may include a transport vehicle such as a gas or electric powered vehicle, a human or robotic driver, and a transport computing device such as a mobile computing device or specialized dedicated computing device for receiving directives/assignments and for transmitting status) will typically secure package or packages to be delivered at the start of the day or sometime during the course of a typical day, and to deliver those package or packages over the course of the day. As a result, such a transportation vehicle unit may or may not have package delivery obligations over the course of the day depending upon whether, for example, the transportation vehicle unit is currently carrying packages for delivery or whether the transportation vehicle unit is assigned/obligated to pick-up and deliver a package in the future—e.g., later in the day.

In some embodiments, in order to select or find a transportation vehicle unit for transporting one or more end users to one or more destination locations, a determination may be made as to whether a transportation vehicle unit, which is currently not carrying any passengers or is about to be free of any passenger load, has any obligation to deliver a package or packages and if the transportation vehicle unit does, in fact, have such a delivery obligation (e.g., deliver a package to its destination location by a certain time) to determine that the delivery obligation is not violated if the transportation vehicle unit does indeed transport the one or more end users. In some cases, when a transportation vehicle unit assigned to transport one or more end users is determined to have one or more obligations for delivering one or more packages, a determination may be made as to which of the one or more packages may be delivered during the transport of the one or more end users. Such a determination may be based, for example, on the proximity of the delivery locations of the one or more packages relative to the route (e.g., a direct route that is the shortest distance or most time efficient route) that the transportation vehicle unit may use in order to transport the one or more end users to the destination location and/or based on end user preferences (e.g., only one package delivery allowed during transportation or no delivery that adds more than 10 minutes to total travel time will be allowed) of at least one of the one or more end users.

Figure 4:
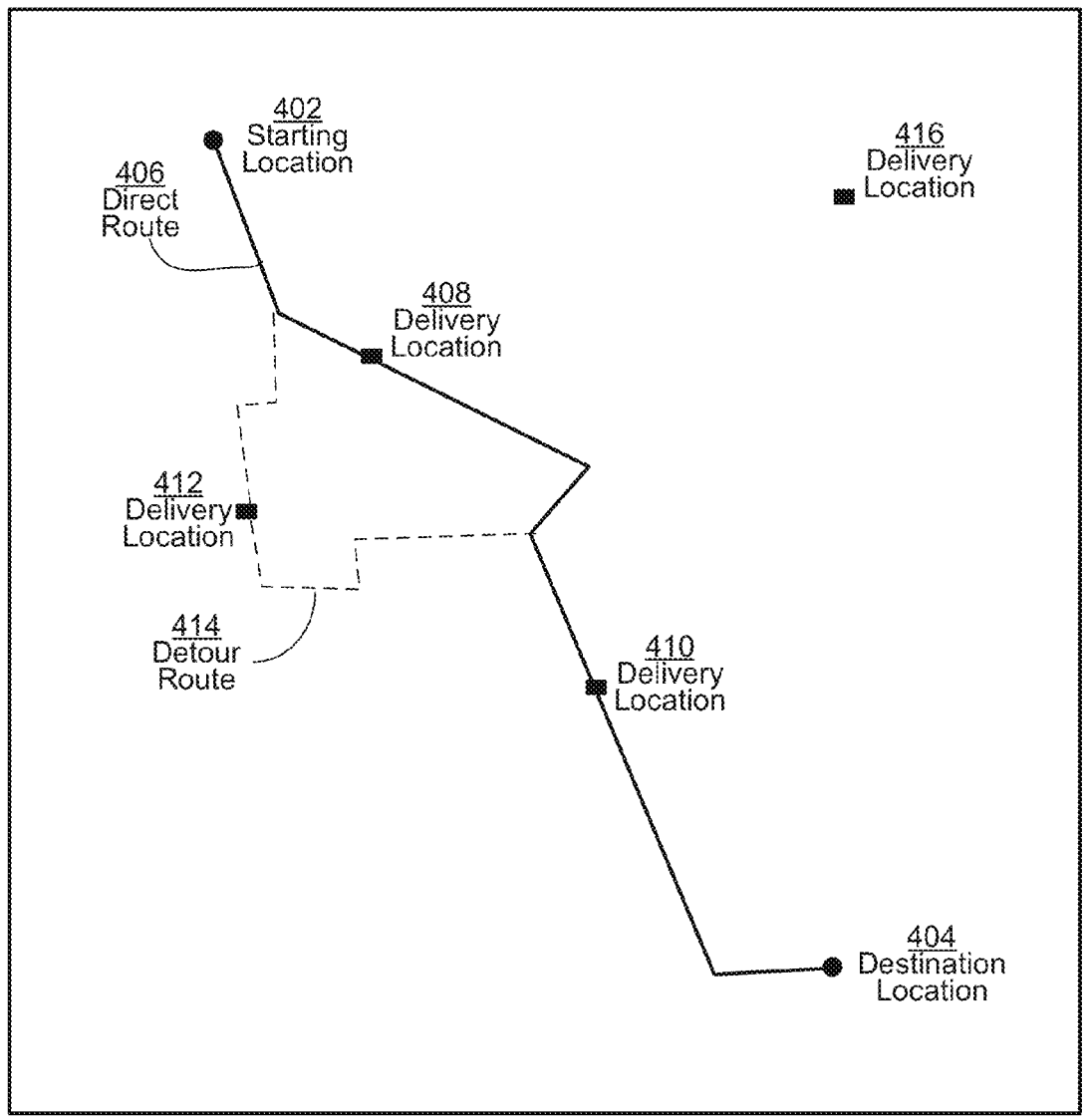
FIG. 4 illustrates exemplary alternative routes to a destination location and delivery locations for packages.

For example, referring now to FIG. 4, which illustrates an exemplary direct route 406 from a starting location 402 (e.g., a rendezvous location where one or more end users may rendezvous with a transportation vehicle unit for transport) to a destination location 404 that an exemplary transportation vehicle unit (e.g., a gas or electric powered automobile with a human or robotic driver may use in order to transport one or more end users to the destination location 404. FIG. 4 further illustrates example delivery locations 408, 410, 412, and 416 of packages (e.g., parcels) that the exemplary transportation vehicle unit may be assigned or obligated to deliver. Note that there are typically many different ways (e.g., routes) for traveling from a starting location 402 to a destination location 404 in a typical urban or semi-urban setting. In some cases a "direct" route 406 may be the shortest distance route that the exemplary transportation vehicle unit may use in order to travel from the starting location to the destination location. In alternative cases, however, the direct route 406 may be the most time efficient route (e.g., fastest or quickest route) that the exemplary transportation vehicle unit may use in order to travel from the starting location to the destination location.

As illustrated, the delivery locations 408, 410, 412, and 416 of the packages that are obligated to be delivered by the exemplary transportation vehicle unit are located in several different locations relative to the direct route 406. Delivery locations 408 and 410, as illustrated, are actually located directly on or proximate to the direct route 406, while delivery location 412 is located in the relative proximity of the direct route 406 and could be reached by the exemplary transportation vehicle unit during the transport of the one or more end users if the exemplary transportation vehicle unit takes a short detour route 414 from the direct route 406. Delivery location 416 in contrast to the delivery locations 408, 410, and 412 is relatively far away from the direct route 406. Thus, any package scheduled to be delivered to the delivery location 416 may, in some cases, not be allowed to be delivered during the transport of the one or more end users to the destination location 404. Note that if the exemplary transportation vehicle unit is obligated to deliver a package to the delivery location 416 by a particular predefined time deadline (e.g., a deadline that will occur during transport of the one or more end users) then that may preclude the exemplary transportation vehicle unit from transporting the one or more end users to the destination location. In such circumstances, another transportation vehicle unit may be assigned to transport the one or more end users that does not have package delivery obligations that would interfere with the transport of the one or more end users.

With respect to the packages that are to be delivered to the delivery locations 408, 410, and 412, the exemplary transportation vehicle unit may or may not deliver such packages during the transport of the one or more end users depending on, for example, preferences (herein "end user preference") of the one or more end users (or of a third party such as the ridesharing or taxi company associated with the transportation vehicle unit). For example, if there is an end user preference that no packages are to be delivered during the transport of the one or more end users then no packages will be delivered during transport of the one or more end users. On the other hand, if there is an end user preference that allows package deliver only for delivery locations along the direct route then only packages to be delivered along the direct route (e.g., packages going to delivery locations 408 and 410) will be allowed to be delivered during transport of the one or more end users. If the end user preference further only allows one package delivery during transport of the one or more end users then only packages going to only one of the two delivery locations (e.g., delivery locations 408 and 410) will actually be allowed.

In some cases, if the end user preferences of the one or more end users allows for "limited" deliveries of packages (e.g., package deliveries that do not require substantial detour from the direct route 406 or that do not add significant amount of travel time to the destination location 404) during the transport of the one or more end users, then packages may be delivered to, for example, the delivery location 412 during transport of the one or more end users. It is recognized that in most instances, passengers (e.g., end users) may not want to have their transportation vehicle to make package deliveries during their transport to their destination location. Thus, in order to provide an incentive, in some cases, passenger transportation fees charged to the end users may be discounted when packages are delivered during the transport of the end users. The passenger fee discount that may be given may be on a sliding scale basis where a greater discount may be given when more package delivery stops are made during the transport of the end users or when more travel time is added to overall travel time of the end users (e.g., the greater the delay in transporting the end users to the destination, the greater the discount). In various embodiments, the determination as to which transportation vehicle unit, which may or may not have package delivery obligations, will be selected for transporting one or more end users or the determination as to which packages, if any, may be delivered by the selected transportation vehicle unit during transport of one or more end users to a destination location may be made by, for example, a network system (e.g., one or more servers) as will be further described herein.

Turning now to FIG. 1, which illustrates a network system 10* operating in an exemplary environment 100. In various embodiments, the various operations and functionalities to be described herein may be implemented by the network system 10*. The network system 10* may be a network device such as server or workstation, or a plurality of network devices such as servers, workstations, storage, and so forth (e.g., "the cloud"). Note that for purposes of the following description "*" represents a wildcard. Thus, references in the following description to, for example, "network system 10*" may be in reference to the network system 10' of FIG. 2A, as well as to the network system 10" of FIG. 2B, which are two different implementations of the network system 10* of FIG. 1.

As further illustrated in FIG. 1, the network system 10* may communicate with one or more end user devices 14, an intermediate network entity 16, and/or one or more transportation vehicle units 20 via one or more wireless and/or wired networks 18. The one or more wireless and/or wired networks 18 may comprise of, for example, one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth.

In various embodiments, an end user device 14 may be associated with one or more end users 12. An end user device 14 may be a mobile device (e.g., a Smartphone or tablet computer) or a personal computer (e.g., a laptop computer, a desktop computer, a workstation, and so forth). Although not depicted in FIG. 1, in various embodiments, the network system 10* may communicate with a transportation vehicle unit 20 (which may comprise of, among other things, a transportation vehicle and a robotic or human driver) via a transport computing device (e.g., a dedicated computing device or a general purpose mobile device such as a Smartphone or tablet computer) associated with the transportation vehicle unit 20 (or associated with a driver of the transportation vehicle unit 20).

In some embodiments, the network system 10* may directly interact/communicate with an end user device 14 and/or transportation vehicle unit 20 via the one or more wireless and/or wired networks 18. In alternative embodiments, however, the network system 10* may interface with an end user device 14 and/or transportation vehicle unit 20 via an intermediate network entity 16. The network entity 16 may be one or more network devices (e.g., servers or workstations) that may be associated with a third party (e.g., a taxi or car service company or a ridesharing company).

In various embodiments, the network system 10* may be designed to keep track of the package delivery obligations of one or more transportation vehicle units 20, and upon receiving a request for transporting one or more end users 12 to one or more destination locations, identifying (e.g., ascertaining) one or more transportation vehicle units 20 for transporting the one or more end users 12 to the one or more destination locations based, at least in part, on the current package delivery obligations (including no current package delivery obligations) of the one or more identified transportation vehicle units 20. For these embodiments, the network system 10* may, upon identifying the one or more transportation vehicle units 20 for transporting the one or more end users 12, may be designed to direct the one or more transportation vehicle units 20 to rendezvous with the one or more end users 12 at one or more rendezvous locations.

Figure 2A:
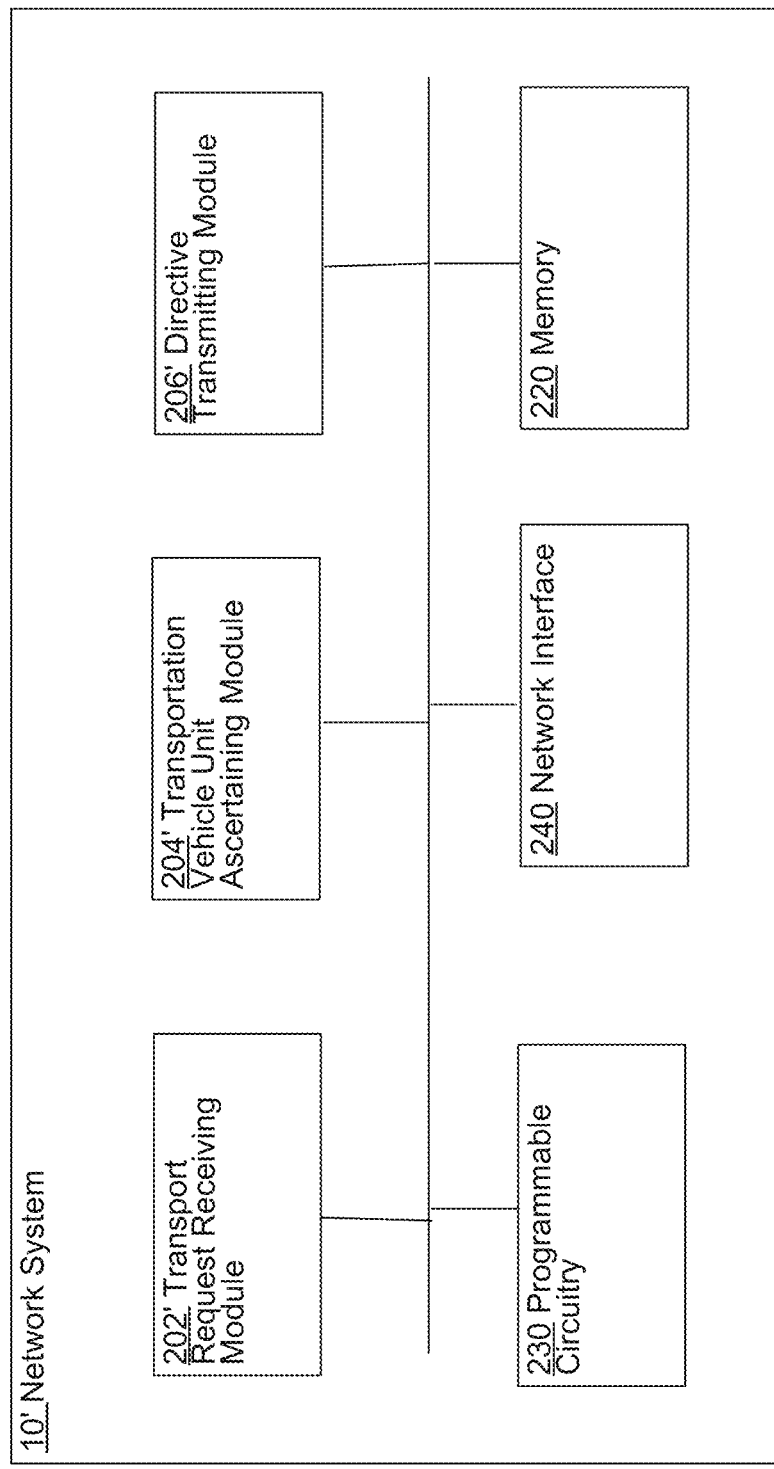
FIG. 2A shows a high-level block diagram of a particular implementation of the network system 10* of FIG. 1.
Figure 2B:
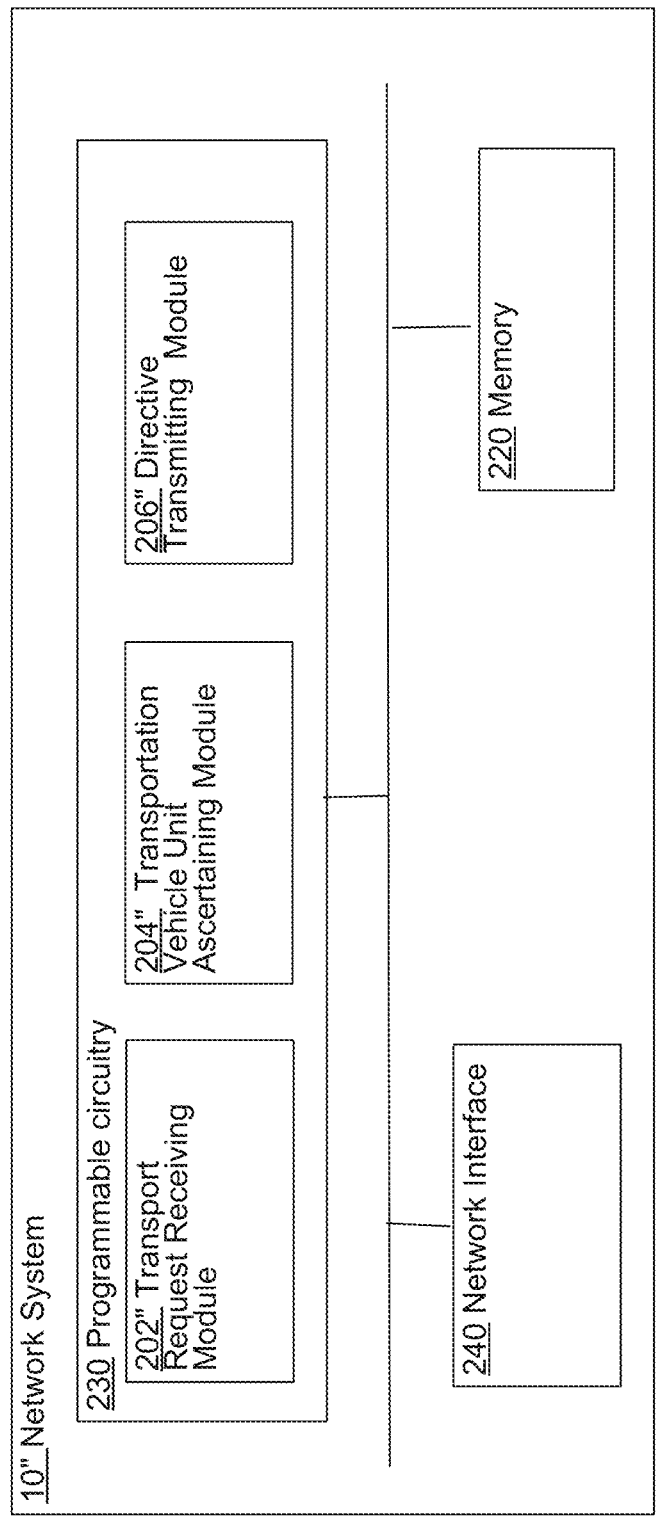
FIG. 2B shows another high-level block diagram of another implementation of the network system 10* of FIG. 1.

Referring now to FIGS. 2A and 2B, which illustrate two block diagrams representing two different implementations of the network system 10* of FIG. 1. In particular, and as will be further described herein, FIG. 2A illustrates a network system 10' that is the "hardwired" or "hard" implementation of the network system 10* that can implement the operations and processes to be described herein. The network system 10' includes certain logic modules including a transport request receiving module 202', a transportation vehicle unit ascertaining module 204' and a directive transmitting module 206' that are implemented using purely hardware or circuitry components (e.g., application specific integrated circuit (or ASIC)). In contrast, FIG. 2B illustrates a network system 10" that is the "soft" implementation of the network system 10' of FIG. 2A in which certain logic modules including a transport request receiving module 202", a transportation vehicle unit ascertaining module 204" and a directive transmitting module 206" are implemented using programmable circuitry 230 (e.g., one or more processors 230 including one or more microprocessors, controllers, CPUs, GPUs, etc.) executing one or more programming instructions (e.g., software).

The embodiments of the network system 10* illustrated in FIGS. 2A and 2B (e.g., the network system 10' of FIG. 2A and the network system 10" of FIG. 2B) are two extreme implementations of the network system 10* in which all of the logic modules (e.g., the transport request receiving module 202', the transportation vehicle unit ascertaining module 204' and the directive transmitting module 206') are implemented using purely hardware solutions (e.g., circuitry such as ASIC) as illustrated in FIG. 2A or in which all of the logic modules (e.g., the transport request receiving module 202", the transportation vehicle unit ascertaining module 204" and the directive transmitting module 206") are implemented using software solutions (e.g., programmable instructions being executed by programmable circuitry 230 such as field programmable gate array (FPGA) or one or more processors) as illustrated in FIG. 2B. Since there are many ways of combining hardware, software, and/or firmware in order to implement the various logic modules (e.g., the transport request receiving module 202*, the transportation vehicle unit ascertaining module 204* and the directive transmitting module 206*), only the two extreme implementations (e.g., the purely hardware solution as illustrated in FIG. 2A and the software solution of FIG. 2B) are illustrated here. It should be noted here that with respect to the "soft" implementation illustrated in FIG. 2B, hardware in the form of programmable circuitry such as one or more processors 230 (or FPGA) are still needed in order to execute the software. Further details related to the two implementations of network system 10* illustrated in FIGS. 2A and 2B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 2A, which illustrates that the network system 10', in addition to the transport request receiving module 202', the transportation vehicle unit ascertaining module 204' and the directive transmitting module 206,' may further include programmable circuitry 230 (e.g., microprocessors, controllers, and so forth), a network interface 240 (network interface card or NIC), and/or memory 220. In various embodiments, memory 220 may comprise of volatile and/or non-volatile memory. In some embodiments, memory 220 may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, the memory 220 may be employed to store a variety of programming instructions (e.g., software) and data including data indicating current package delivery obligations of transportation vehicle units 20, end user preferences, current passenger and/or package delivery status of transportation vehicle units 20, and so forth.

Turning now to FIG. 2B, which illustrates a network system 10" in which certain logic modules (the transport request receiving module 202", the transportation vehicle unit ascertaining module 204" and the directive transmitting module 206") are implemented using programmable circuitry 230. In addition, the network system 10" may further include a memory 220 and a network interface 240 similar to the network system 10' of FIG. 2A.

In various embodiments the transport request receiving module 202* of FIG. 2A or 2B (e.g., the transport request receiving module 202' of FIG. 2A or the transport request receiving module 202" of FIG. 2B) may be configured to, among other things, receive a request for transporting one or more end users 12. In contrast, the transportation vehicle unit ascertaining module 204* of FIG. 2A or 2B (e.g., the transportation vehicle unit ascertaining module 204' of FIG. 2A or the transportation vehicle unit ascertaining module 204" of FIG. 2B) may be configured to, among other things, identify or ascertain one or more transportation vehicle units 20 for transporting the one or more end users 12 to one or more destination locations based, at least in part, on determining whether the one or more transportation vehicle units 20 have one or more delivery package obligations. Meanwhile, the directive transmitting module 206* of FIG. 2A or 2B (e.g., the directive transmitting module 206' of FIG. 2A or the directive transmitting module 206" of FIG. 2B) may be configured to, among other things, transmit one or more directives that direct the one or more transportation vehicle units 20 to rendezvous with the one or more end users 12 in order to transport the one or more end users 12 to the one or more destination locations.

Referring now to FIG. 3A illustrating a particular implementation of the transport request receiving module 202* (e.g., the transport request receiving module 202' or the transport request receiving module 202") of FIG. 2A or 2B. As illustrated, the transport request receiving module 202* may include one or more sub-logic modules in various alternative implementations. For example, in various embodiments, the transport request receiving module 202* may further include an end user preference data receiving module 302, an end user location data receiving module 304, and/or a passenger data receiving module 306. Specific details related to the transport request receiving module 202* as well as the above-described sub-modules of the transport request receiving module 202* will be provided below with respect to the operations and processes to be described herein.

FIG. 3B illustrates a particular implementation of the transportation vehicle unit ascertaining module 204* (e.g., the transportation vehicle unit ascertaining module 204' or the transportation vehicle unit ascertaining module 204") of FIG. 2A or 2B. As illustrated, the transportation vehicle unit ascertaining module 204* may include one or more sub-logic modules in various alternative implementations. For example, in various embodiments, the transportation vehicle unit ascertaining module 204* may further include a proximate vicinity transportation vehicle unit determining module 308, a non-violating transportation vehicle unit determining module 310, an end user preference compliant transportation vehicle unit determining module 312, an end user transport requirement compliant determining module 314, and/or a driver preference compliant determining module 316. Specific details related to the directive transmitting module 206" as well as the above-described sub-modules of the directive transmitting module 206* will be provided below with respect to the operations and processes to be described herein.

Figure 5:
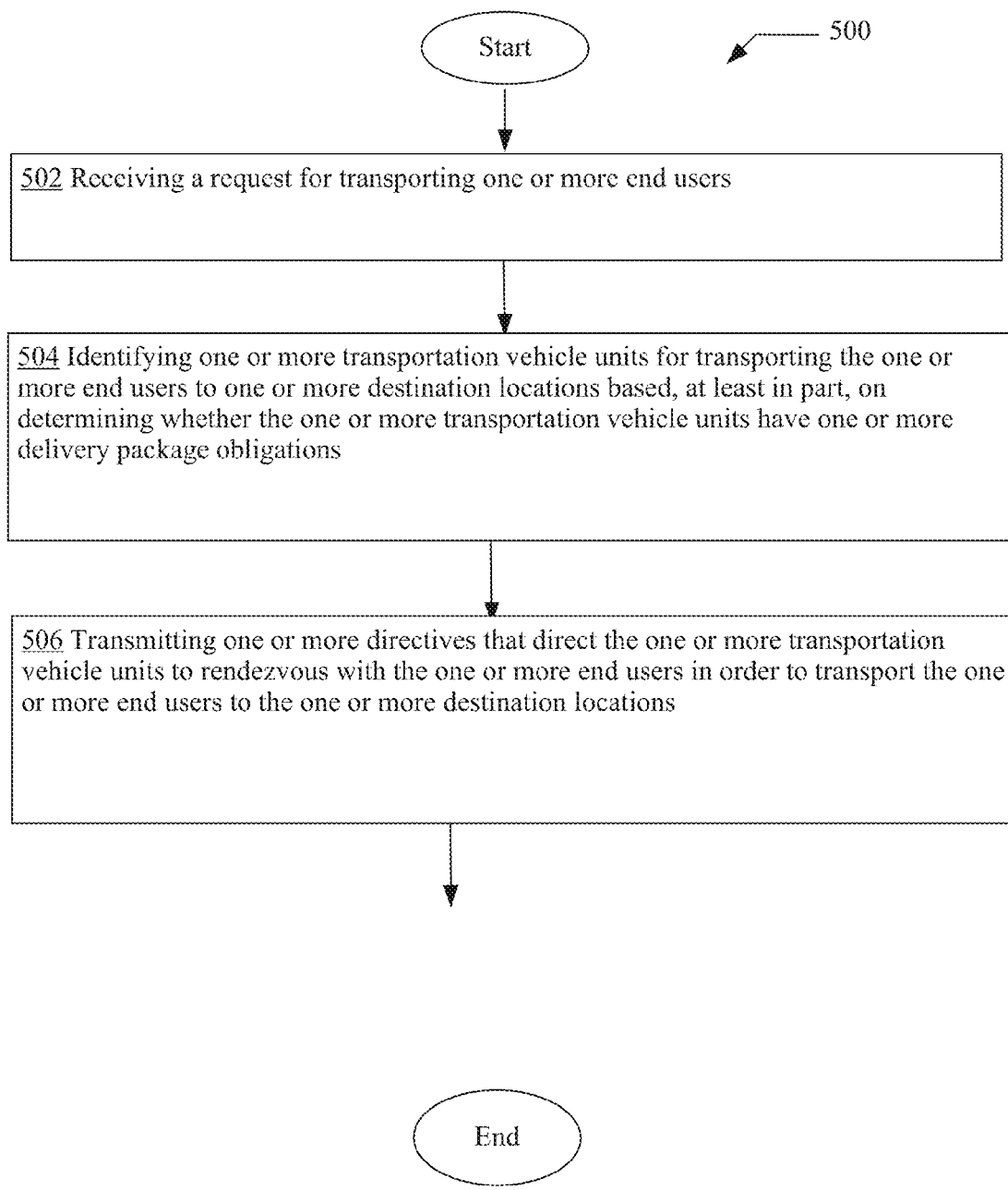
FIG. 5 is a high-level logic flowchart of a process, e.g., operational flow 500, according to some embodiments.

In the following, various operations associated with the above described network system 10* (e.g., the network system 10' of FIG. 2A or the network system 10" of FIG. 2B) will be presented in accordance with various alternative embodiments. FIG. 5, for example, illustrates an operational flow 500 representing example computationally-implemented operations that may be implemented for, among other things, identifying or ascertaining one or more transportation vehicle units for transporting one or more end users to one or more destination locations, the identifying or ascertaining being based, at least in part, on determining whether the one or more transportation vehicle units have one or more delivery package obligations.

In FIG. 5 and in the following figures that include various examples of operational flows, discussions and explanations will be provided with respect to the network system 10* described above and as illustrated in FIGS. 2A, 2B, 3A, and 3B, and/or with respect to other examples (e.g., as provided in FIGS. 1 and 4) and contexts. However, it should be understood that the operational flows may be executed in a number of other environments and contexts, and/or in modified versions of FIGS. 1, 2A, 2B, 3A, 3B, and/or 4. Also, although the various operational flows are presented in the sequence(s) illustrated, it should be understood that the various operations may be performed in orders other than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 500 of FIG. 5 may move to a transport request receiving operation 502 for receiving a request for transporting one or more end users. For instance, and as illustration, the transport request receiving module 202* of the network system 10* of FIG. 2A or 2B (e.g., the transport request receiving module 202' of FIG. 2A or the transport request receiving module 202" of FIG. 2B) receiving a request (e.g., a request for a transportation vehicle unit 20) for transporting one or more end users 12. In various implementations, the request may be received from an end user device 14 (e.g., a PC or a mobile computing device such as a Smartphone) or from an intermediate network entity 16 (e.g., a network device such as a workstation or a server associated with a third party).

Operational flow 500 may also include a transportation vehicle unit identifying operation 504 for identifying one or more transportation vehicle units for transporting the one or more end users to one or more destination locations based, at least in part, on determining whether the one or more transportation vehicle units have one or more delivery package obligations. For instance, the transportation vehicle unit ascertaining module 204* (e.g., the transportation vehicle unit ascertaining module 204' of FIG. 2A or the transportation vehicle unit ascertaining module 204" of FIG. 2B) of the network system 10* of FIG. 2A or 2B identifying or ascertaining one or more transportation vehicle units 20 for transporting the one or more end users 12 to one or more destination locations based, at least in part, on determining whether or not the one or more transportation vehicle units 20 have one or more delivery package obligations (e.g., assignments to deliver one or more packages).

As further illustrated in FIG. 5, operational flow 500 may further include a directive transmitting operation 506 for transmitting one or more directives that direct the one or more transportation vehicle units to rendezvous with the one or more end users in order to transport the one or more end users to the one or more destination locations. For instance, the directive transmitting module 206* (e.g., the directive transmitting module 206' of FIG. 2A or the directive transmitting module 206" of FIG. 2B) of the network system 10* of FIG. 2A or 2B transmitting one or more directives that direct the one or more transportation vehicle units 20 to rendezvous with the one or more end users 12 at one or more rendezvous locations in order to transport the one or more end users 12 to the one or more destination locations.

Figure 6A:
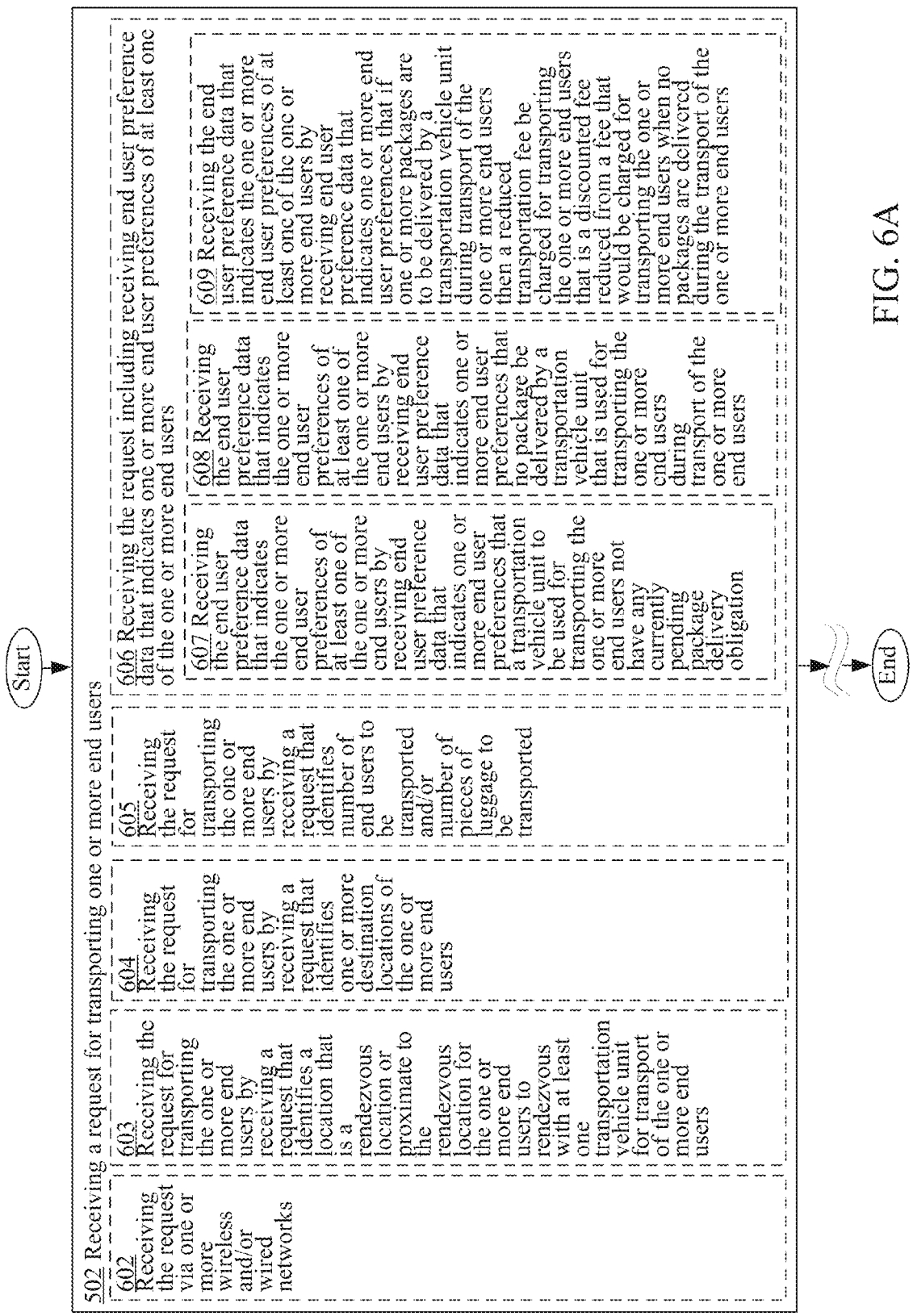
FIG. 6A is a high-level logic flowchart of a process depicting alternate implementations of the transport request receiving operation 502 of FIG. 5.
Figure 6B:
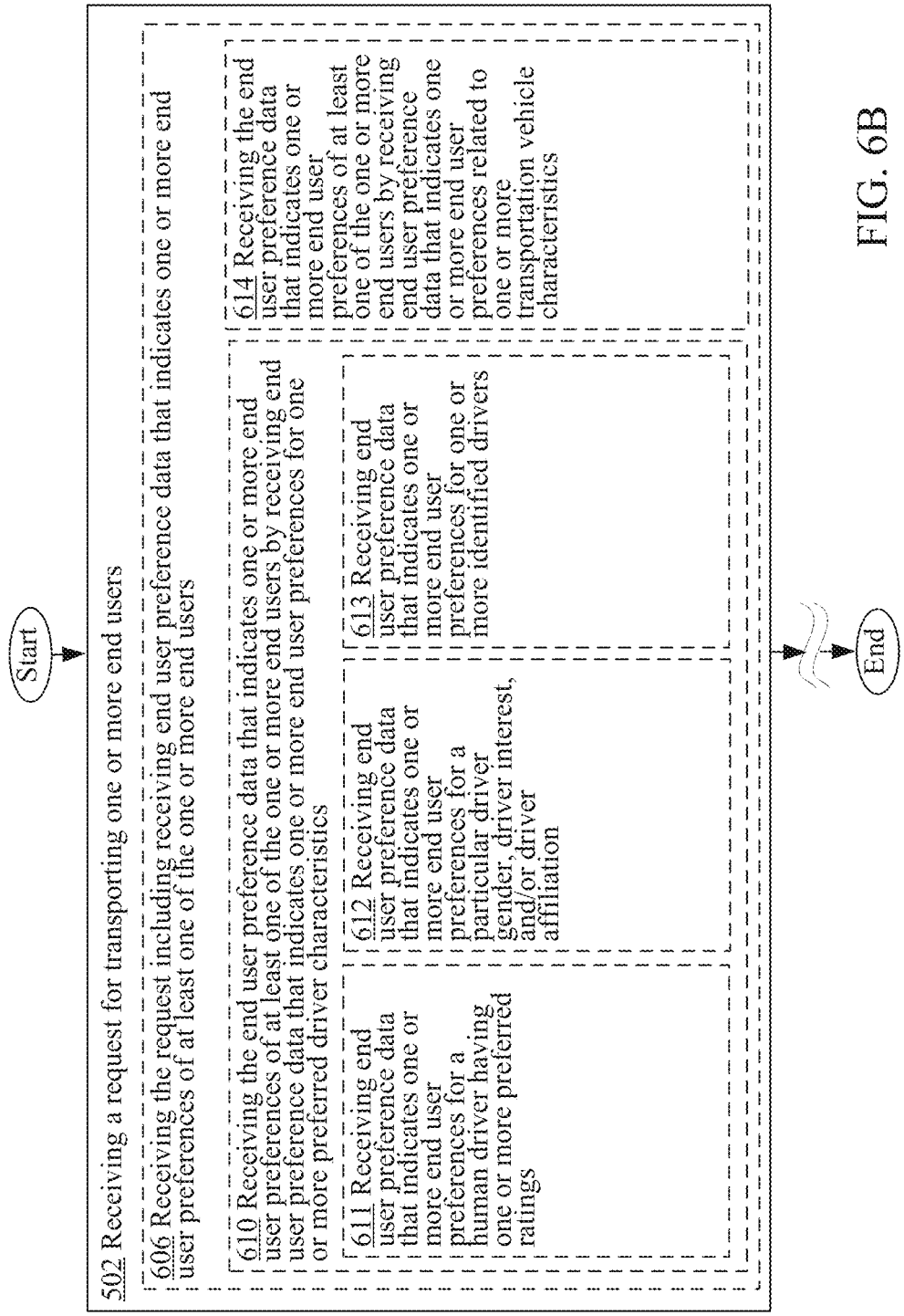
FIG. 6B is a high-level logic flowchart of a process depicting alternate implementations of the transport request receiving operation 502 of FIG. 5.
Figure 6C:
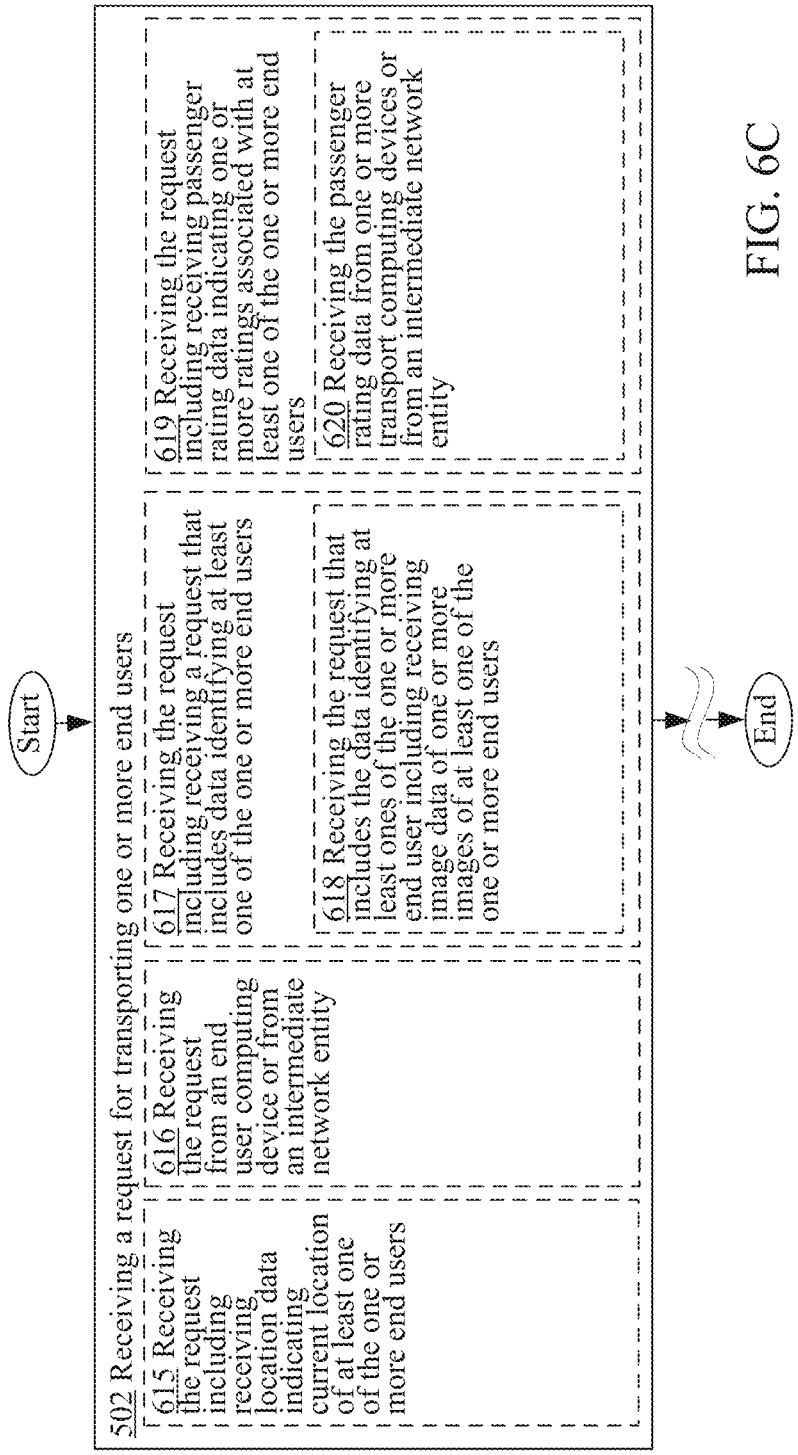
FIG. 6C is a high-level logic flowchart of a process depicting alternate implementations of the transport request receiving operation 502 of FIG. 5.

As will be described below, the transport request receiving operation 502, the transportation vehicle unit identifying operation 504, and the directive transmitting operation 506 may be executed in a variety of different ways in various alternative implementations. FIGS. 6A, 6B, and 6C, for example, illustrate at least some of the alternative ways that the transport request receiving operation 502 of FIG. 5 may be executed in various alternative implementations. In some cases, for example, the transport request receiving operation 502 may include an operation 602 for receiving the request via one or more wireless and/or wired networks as illustrated in FIG. 6A. For instance, the transport request receiving module 202* of the network system 10* (e.g., the network system 10' of FIG. 2A or the network system 10" of FIG. 2B) receiving the request via one or more wireless and/or wired networks (e.g., cellular data network, WLAN, WAN, MAN (metropolitan area network, Ethernet, etc.). In some cases, the transport request receiving module 202* may control a network interface 240 in order to receive the request.

In various implementations, the request receiving operation 502 may include an operation 603 for receiving the request for transporting the one or more end users by receiving a request that identifies a location that is a rendezvous location or proximate to the rendezvous location for the one or more end users to rendezvous with at least one transportation vehicle unit for transport of the one or more end users. For instance, the transport request receiving module 202* of the network system 10* of FIG. 2A or 2B receiving the request for transporting the one or more end users 12 by receiving a request that identifies a location that is a rendezvous location or proximate to the rendezvous location (e.g., within a city street block from the rendezvous location) for the one or more end users to rendezvous with at least one transportation vehicle unit 20 for transport of the one or more end users 12.

In the same or alternative implementations, the transport request receiving operation 502 may alternatively or additionally include or involve an operation 604 for receiving the request for transporting the one or more end users by receiving a request that identifies one or more destination locations of the one or more end users. For instance, the transport request receiving module 202* of the network system 10* of FIG. 2A or 2B receiving the request for transporting the one or more end users 12 by receiving a request that identifies (e.g., street address or geographic coordinates) one or more destination locations of the one or more end users 12.

In the same or alternative implementations, the transport request receiving operation 502 may alternatively or additionally include or involve an operation 605 for receiving the request for transporting the one or more end users by receiving a request that identifies number of end uses to be transported and/or number of pieces of luggage to be transported. For instance, the transport request receiving module 202* of the network system 10* of FIG. 2A or 2B receiving the request for transporting the one or more end users 12 by receiving a request that identifies number of end users 12 (e.g., passengers) to be transported and/or number of pieces of luggage to be transported. In some cases, the request may also indicate the size and shapes of the pieces of luggage to be transported.

In the same or alternative implementations, the transport request receiving operation 502 may alternatively or additionally include or involve an operation 606 for receiving the request including receiving end user preference data that indicates one or more end user preferences of at least one of the one or more end users. For instance, the transport request receiving module 202* including the end user preference data receiving module 302 (see FIG. 3A) of the network system 10* of FIG. 2A or 2B receiving the request including receiving, by the end user preference data receiving module 302, end user preference data that indicates one or more end user preferences of at least one of the one or more end users 12. In some cases, the end user preference data may be received prior to reception of the request while in other cases, the end user preference data may be received with the request or subsequent to receiving the request. In some cases, the end user preference data may be provided by an end user device 14 (e.g., a Smartphone) associated with an end user 12, while in some other cases, the end user preference data may, for example, be provided by an intermediate network entity 16 (e.g., a server associated with a third party). Note that in various embodiments the one or more end user preferences indicated by the end user preference data may be the actual preferences of an end user 12. In alternative embodiments, however, the one or more end user preferences may be the preferences of a third party that prefers that at least one of the end users 12 be transported in a particular manner.

As further illustrated in FIGS. 6A and 6B, operation 606 may further include one or more additional operations including, in some cases, an operation 607 for receiving the end user preference data that indicates the one or more end user preferences of at least one of the one or more end users by receiving end user preference data that indicates one or more end user preferences that a transportation vehicle unit to be used for transporting the one or more end users not have any currently pending package delivery obligation as illustrated in FIG. 6A. For instance, the end user preference data receiving module 302 of the network system 10\* of FIG. 2A or 2B receiving the end user preference data that indicates the one or more end user preferences of at least one of the one or more end users 12 by receiving end user preference data that indicates one or more end user preferences that a transportation vehicle unit 20 to be used for transporting the one or more end users 12 not have any currently pending package delivery obligation (e.g., package delivery obligation that requires the transportation vehicle unit 20 to deliver one or more packages during the day that the one or more end users 12 are to be transported).

In the same or alternative implementations, operation 606 may alternatively or additionally include an operation 608 for receiving the end user preference data that indicates the one or more end user preferences of at least one of the one or more end users by receiving end user preference data that indicates one or more end user preferences that no package be delivered by a transportation vehicle unit that is used for transporting the one or more end users during transport of the one or more end users. For instance, the end user preference data receiving module 302 of the network system 10\* of FIG. 2A or 2B receiving the end user preference data that indicates the one or more end user preferences of at least one of the one or more end users 12 by receiving end user preference data that indicates one or more end user preferences that no package be delivered by a transportation vehicle unit 20 that is used for transporting the one or more end users 12 during transport of the one or more end users 12.

In the same or alternative implementations, operation 606 may alternatively or additionally include an operation 609 for receiving the end user preference data that indicates the one or more end user preferences of at least one of the one or more end users by receiving end user preference data that indicates one or more end user preferences that if one or more packages are to be delivered by a transportation vehicle unit during transport of the one or more end users then a reduced transportation fee be charged for transporting the one or more end users that is a discounted fee reduced from a fee that would be charged for transporting the one or more end users when no packages are delivered during the transport of the one or more end users. For instance, the end user preference data receiving module 302 of the network system 10\* of FIG. 2A or 2B receiving the end user preference data that indicates the one or more end user preferences of at least one of the one or more end users 12 by receiving end user preference data that indicates one or more end user preferences that if one or more packages are to be delivered by a transportation vehicle unit 20 during transport of the one or more end users 12 then a reduced transportation fee be charged for transporting the one or more end users 12 that is a discounted fee reduced from a fee that would be charged for transporting the one or more end users 12 when no packages are delivered during the transport of the one or more end users 12 from, for example, the same starting location to the same destination location.

In the same or alternative implementations, operation 606 may alternatively or additionally include an operation 610 for receiving the end user preference data that indicates one or more end user preferences of at least one of the one or more end users by receiving end user preference data that indicates one or more end user preferences for one or more preferred driver characteristics as illustrated in FIG. 6B. For instance, the end user preference data receiving module 302 of the network system 10\* of FIG. 2A or 2B receiving the end user preference data that indicates one or more end user preferences of at least one of the one or more end users 12 by receiving end user preference data that indicates one or more end user preferences for one or more preferred driver characteristics (e.g., preferred characteristics of human drivers who will be driving transportation vehicle units 20 that will be transporting the one or more end users 12).

In some implementations, operation 610 may, in turn, further include an operation 611 for receiving end user preference data that indicates one or more end user preferences for a human driver having one or more preferred ratings. For instance, the end user preference data receiving module 302 of the network system 10\* of FIG. 2A or 2B receiving end user preference data that indicates one or more end user preferences for a human driver having one or more preferred ratings (e.g., end user preference that a human driver having an average rating from other end users 12 that is higher than a certain rating number).

In the same or different implementations, operation 610 may additionally or alternatively include an operation 612 for receiving end user preference data that indicates one or more end user preferences for a particular driver gender, driver interest, and/or driver affiliation. For instance, the end user preference data receiving module 302 of the network system 10\* of FIG. 2A or 2B receiving end user preference data that indicates one or more end user preferences for a particular driver gender (e.g., female), driver interest (e.g., New York JETS), and/or driver affiliation (e.g., religious or school affiliation).

In the same or different implementations, operation 610 may additionally or alternatively include an operation 613 for receiving end user preference data that indicates one or more end user preferences for one or more identified drivers. For instance, the end user preference data receiving module 302 of the network system 10\* of FIG. 2A or 2B receiving end user preference data that indicates one or more end user preferences for one or more identified drivers (e.g., pre-approved drivers). Thus, if two drivers are available for transporting the one or more end users 12, then the driver who has been pre-approved may be selected for transporting the one or more end users 12.

In some implementations, operation 606 for receiving the request including receiving end user preference data that indicates one or more end user preferences of at least one of the one or more end users may include an operation 614 for receiving the end user preference data that indicates one or more end user preferences of at least one of the one or more end users by receiving end user preference data that indicates one or more end user preferences related to one or more transportation vehicle characteristics. For instance, the end user preference data receiving module 302 of the network system 10\* of FIG. 2A or 2B receiving the end user preference data that indicates one or more end user preferences of at least one of the one or more end users 12 by receiving end user preference data that indicates one or more end user preferences related to one or more transportation vehicle characteristics (e.g., preference for particular car models, preference for a functional air-conditioner, and so forth).

Turning to FIG. 6C, in various implementations, the transport request receiving operation 502 may include an operation 615 for receiving the request including receiving location data indicating current location of at least one of the one or more end users. For instance, the transport request receiving module 202\* including the end user location data receiving module 304 (see FIG. 3A) of the network system 10\* of FIG. 2A or 2B receiving the request including receiving, by the end user location data receiving module 304, location data (e.g., GPS data) indicating current location of at least one of the one or more end users 12.

In the same or alternative implementations, the transport request receiving operation 502 may additionally or alternatively include an operation 616 for receiving the request from an end user computing device or from an intermediate network entity. For instance, the transport request receiving module 202\* of the network system 10\* of FIG. 2A or 2B receiving the request from an end user computing device 14 (e.g., a desktop computer or a mobile device such as a Smartphone) or from an intermediate network entity 16 (e.g., a server associated with a third party).

In the same or alternative implementations, the transport request receiving operation 502 may additionally or alternatively include an operation 617 for receiving the request including receiving a request that includes data identifying at least one of the one or more end users. For instance, the transport request receiving module 202\* of the network system 10\* of FIG. 2A or 2B receiving the request including receiving a request that includes data identifying (e.g., name, user ID, and so forth) at least one of the one or more end users 12.

In some cases, operation 617 may further include an operation 618 for receiving the request that includes the data identifying at least one of the one or more end user including receiving image data of one or more images of at least one of the one or more end users. For instance, the transport request receiving module 202\* of the network system 10\* of FIG. 2A or 2B receiving the request that includes the data identifying at least one of the one or more end users 12 including receiving image data of one or more images (e.g., facial images) of at least one of the one or more end users 12.

In various implementations, the transport request receiving operation 502 may include an operation 619 for receiving the request including receiving passenger rating data indicating one or more ratings associated with at least one of the one or more end users. For instance, the transport request receiving module 202\* including the passenger rating data receiving module 306 (see FIG. 6C) of the network system 10\* of FIG. 2A or 2B receiving the request including receiving, by the passenger rating data receiving module 306, passenger rating data indicating one or more ratings associated with at least one of the one or more end users 12. Such passenger rating data may be provided by an intermediate network entity 16 or from one or more drivers who have previously transported the at least one of the one or more end users 12.

In some cases, operation 619 may further include an operation 620 for receiving the passenger rating data from one or more transport computing devices or from an intermediate network entity. For instance, the passenger rating data receiving module 306 of the network system 10\* of FIG. 2A or 2B receiving the passenger rating data from one or more transport computing devices 14 or from an intermediate network entity 16.

Figure 7A:
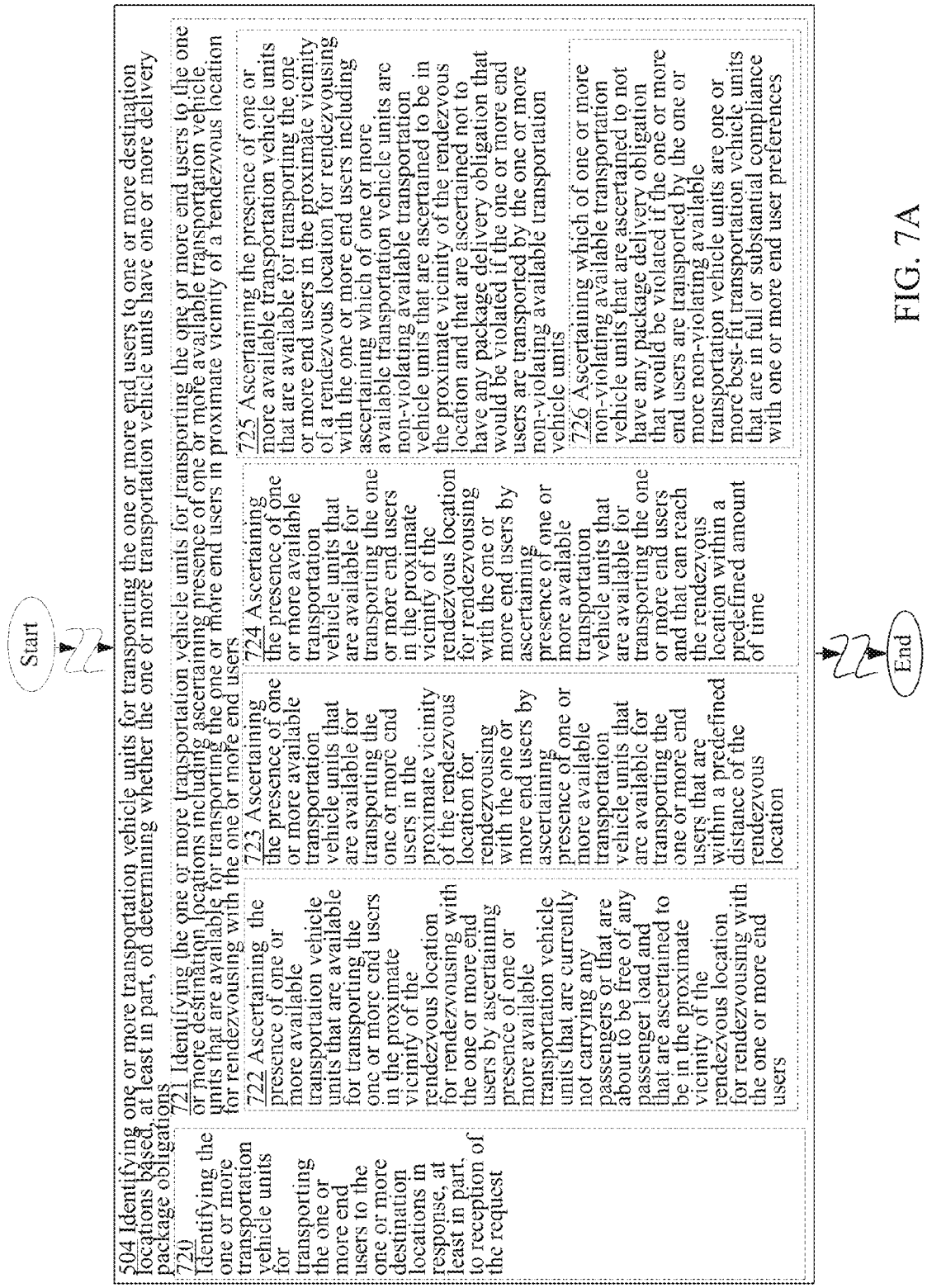
FIG. 7A is a high-level logic flowchart of a process depicting alternate implementations of the transportation vehicle unit identifying operation 504 of FIG. 5.

Referring back to the transportation vehicle unit identifying operation 504 of FIG. 5, the transportation vehicle unit identifying operation 504 similar to the transport request receiving operation 502 of FIG. 5 may be executed in a number of different ways in various alternative embodiments as illustrated, for example, in FIGS. 7A, 7B, 7C, 7D, 7E, 7F, and 7G. In some cases, for example, the transportation vehicle unit identifying operation 504 may actually include an operation 720 for identifying the one or more transportation vehicle units for transporting the one or more end users to the one or more destination locations in response, at least in part, to reception of the request as illustrated in FIG. 7A. For instance, the transportation vehicle unit ascertaining module 204\* of the network system 10\* of FIG. 2A or 2B identifying or ascertaining the one or more transportation vehicle units 20 for transporting the one or more end users 12 to the one or more destination locations in response, at least in part, to reception of the request for transporting the one or more end users 12 by, for example, the transport request receiving module 202.

In the same or alternative implementations, the transportation vehicle unit identifying operation 504 may include an operation 721 for identifying the one or more transportation vehicle units for transporting the one or more end users to the one or more destination locations including ascertaining presence of one or more available transportation vehicle units that are available for transporting the one or more end users in proximate vicinity of a rendezvous location for rendezvousing with the one or more end users. For instance, the transportation vehicle unit ascertaining module 204\* including the proximate vicinity transportation vehicle unit determining module 308 (see FIG. 3B) of the network system 10\* of FIG. 2A or 2B identifying or ascertaining the one or more transportation vehicle units 20 for transporting the one or more end users 12 to the one or more destination locations including ascertaining or determining, by the proximate vicinity transportation vehicle unit determining module 308, presence of one or more "available" transportation vehicle units (e.g., the transportation vehicle units 20 of FIG. 1) that are available for transporting the one or more end users 12 in proximate vicinity (e.g., within some predefined distance such as within two miles) of a rendezvous location (e.g., the current location of at least one of the one or more end users 12 or a predefined location as indicated by one of the one or more end users 12) for rendezvousing with the one or more end users 12. The phrase "available" transportation vehicle unit may be reference to a transportation vehicle unit 20 that does not currently have passenger or is not currently have an obligation to transport passengers that would not impede the transport of the one or more end users 12 to their destination location or locations.

As further illustrated in FIG. 7A, in various implementations operation 721 may further include one or more additional operations including, in some cases, an operation 722 for ascertaining the presence of one or more available transportation vehicle units that are available for transporting the one or more end users in the proximate vicinity of the rendezvous location for rendezvousing with the one or more end users by ascertaining presence of one or more available transportation vehicle units that are currently not carrying any passengers or that are about to be free of any passenger load and that are ascertained to be in the proximate vicinity of the rendezvous location for rendezvousing with the one or more end users. For instance, the proximate vicinity transportation vehicle unit determining module 308 of the network system 10* of FIG. 2A or 2B ascertaining the presence of one or more available transportation vehicle units (e.g., transportation vehicle units 20 of FIG. 1) that are available for transporting the one or more end users 12 in the proximate vicinity of the rendezvous location for rendezvousing with the one or more end users 12 by ascertaining or determining presence of one or more available transportation vehicle units (e.g., transportation vehicle units 20 of FIG. 1) that are currently not carrying any passengers (e.g., end users 12) or that are about to be (e.g., within the next five minutes) free of any passenger load and that are ascertained to be in the proximate vicinity (e.g., within one mile) of the rendezvous location for rendezvousing with the one or more end users 12.

In the same or alternative implementations, operation 721 may additionally or alternatively include an operation 723 for ascertaining the presence of one or more available transportation vehicle units that are available for transporting the one or more end users in the proximate vicinity of the rendezvous location for rendezvousing with the one or more end users by ascertaining presence of one or more available transportation vehicle units that are available for transporting the one or more end users that are within a predefined distance of the rendezvous location. For instance, the proximate vicinity transportation vehicle unit determining module 308 of the network system 10* of FIG. 2A or 2B ascertaining the presence of one or more available transportation vehicle units (e.g., transportation vehicle units 20 of FIG. 1) that are available for transporting the one or more end users 12 in the proximate vicinity of the rendezvous location for rendezvousing with the one or more end users 12 by ascertaining or determining presence of one or more available transportation vehicle units (e.g., transportation vehicle units 20 of FIG. 1) that are available for transporting the one or more end users 12 that are within a predefined distance (e.g., one mile) of the rendezvous location.

In some implementations, operation 721 may include an operation 724 for ascertaining the presence of one or more available transportation vehicle units that are available for transporting the one or more end users in the proximate vicinity of the rendezvous location for rendezvousing with the one or more end users by ascertaining presence of one or more available transportation vehicle units that are available for transporting the one or more end users and that can reach the rendezvous location within a predefined amount of time. For instance, the proximate vicinity transportation vehicle unit determining module 308 of the network system 10* of FIG. 2A or 2B ascertaining the presence of one or more available transportation vehicle units (e.g., transportation vehicle units 20 of FIG. 1) that are available for transporting the one or more end users 12 in the proximate vicinity of the rendezvous location for rendezvousing with the one or more end users 12 by ascertaining or determining presence of one or more available transportation vehicle units (e.g., transportation vehicle units 20 of FIG. 1) that are available for transporting the one or more end users 12 and that can reach the rendezvous location within a predefined amount of time (e.g., 10 minutes). In some cases, this may involve calculating how long it will take an available transportation vehicle unit 20 to reach the rendezvous location from its current location based on speed limits, traffic conditions, number of stop lights, and so forth.

In various implementations, operation 721 may include an operation 725 for ascertaining the presence of one or more available transportation vehicle units that are available for transporting the one or more end users in the proximate vicinity of a rendezvous location for rendezvousing with the one or more end users including ascertaining which of one or more available transportation vehicle units are non-violating available transportation vehicle units that are ascertained to be in the proximate vicinity of the rendezvous location and that are ascertained not to have any package delivery obligation that would be violated if the one or more end users are transported by the one or more non-violating available transportation vehicle units. For instance, the proximate vicinity transportation vehicle unit determining module 308 and the non-violating transportation vehicle unit determining module 310 (see FIG. 3B) of the network system 10* of FIG. 2A or 2B ascertaining the presence of one or more available transportation vehicle units (e.g., transportation vehicle units 20 of FIG. 1) that are available for transporting the one or more end users 12 in the proximate vicinity of a rendezvous location for rendezvousing with the one or more end users 12 including ascertaining or determining which of one or more available transportation vehicle units (e.g., transportation vehicle units 20 of FIG. 1) are non-violating available transportation vehicle units that are ascertained or determined to be in the proximate vicinity of the rendezvous location and that are ascertained or determined, by the non-violating transportation vehicle unit determining module 310, to not having any package delivery obligation that would be violated if the one or more end users 12 are transported by the one or more non-violating available transportation vehicle units.

In some cases, operation 725 may further include an operation 726 for ascertaining which of one or more non-violating available transportation vehicle units that are ascertained to not have any package delivery obligation that would be violated if the one or more end users are transported by the one or more non-violating available transportation vehicle units are one or more best-fit transportation vehicle units that are in full or substantial compliance with one or more end user preferences. For instance, the proximate vicinity transportation vehicle unit determining module 308 and the non-violating transportation vehicle unit determining module 310 of the network system 10* of FIG. 2A or 2B ascertaining which of one or more non-violating available transportation vehicle units (e.g., transportation vehicle units 20 of FIG. 1) that are ascertained to not have any package delivery obligation that would be violated if the one or more end users 12 are transported by the one or more non-violating available transportation vehicle units are one or more best-fit transportation vehicle units that are ascertained or determined by the end user preference compliant transportation vehicle unit determining module 312 (see FIG. 3B) to be in full or substantial compliance with one or more end user preferences.

Figure 7B:
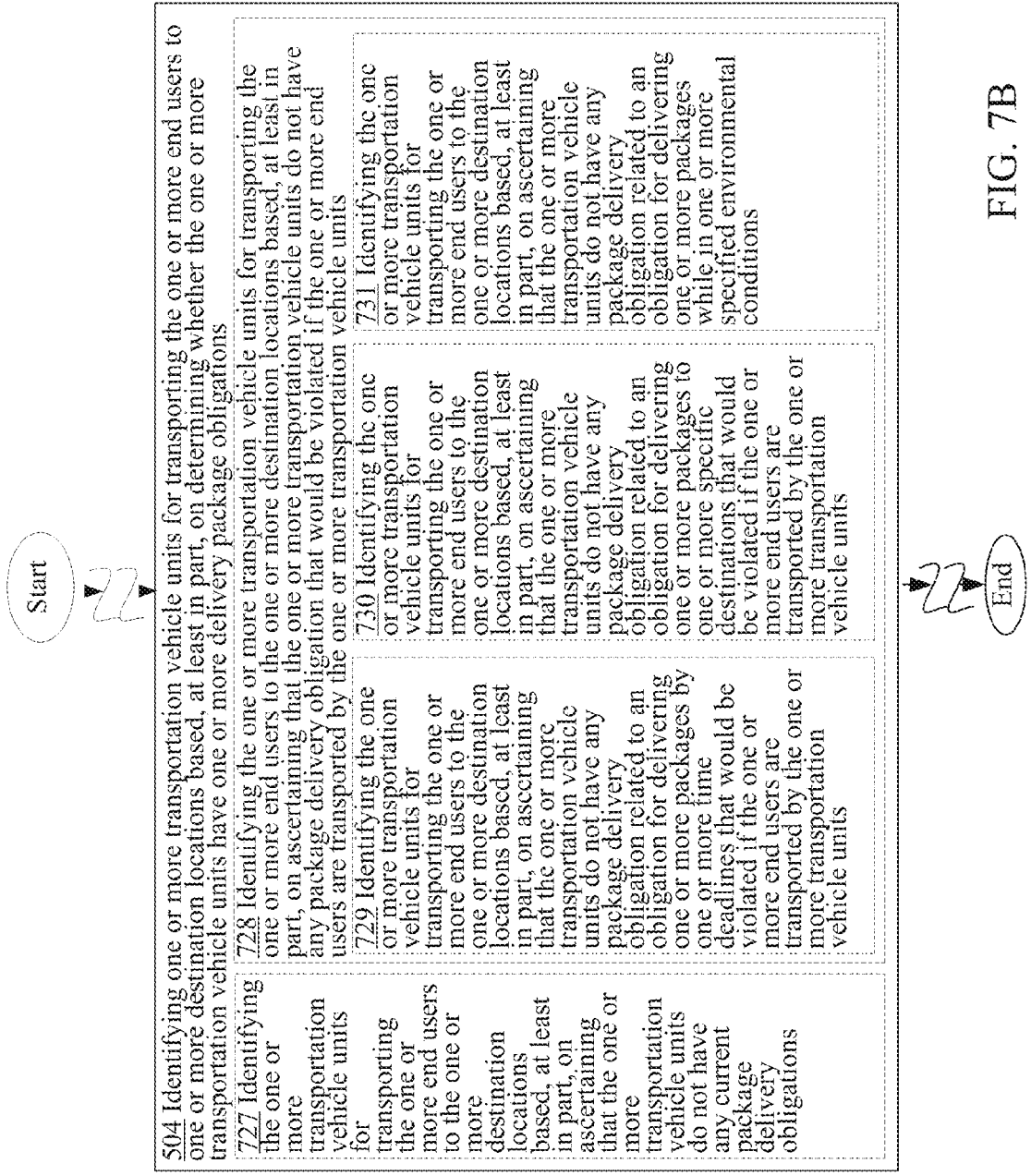
FIG. 7B is a high-level logic flowchart of a process depicting alternate implementations of the transportation vehicle unit identifying operation 504 of FIG. 5.

Referring now to FIG. 7B, in the same or alternative implementations, the transportation vehicle unit identifying operation 504 may additionally or alternatively include an operation 727 for identifying the one or more transportation vehicle units for transporting the one or more end users to the one or more destination locations based, at least in part, on ascertaining that the one or more transportation vehicle units do not have any current package delivery obligations.

For instance, the transportation vehicle unit ascertaining module 204* including the non-violating transportation vehicle unit determining module 310 of the network system 10* of FIG. 2A or 2B identifying the one or more transportation vehicle units 20 for transporting the one or more end users 12 to the one or more destination locations based, at least in part, on ascertaining or determining by the non-violating transportation vehicle unit determining module 310 that the one or more transportation vehicle units 20 do not have any current package delivery obligations. Note that the non-violating transportation vehicle unit determining module 310 (see FIG. 3B) of the network system 10* may, in addition to being able to determine whether a transportation vehicle unit 20 has a package delivery obligation that would be violated if the transportation vehicle unit 20 transports one or more end users 12, determine whether a transportation vehicle unit 20 has any current package delivery obligations.

In the same or alternative implementations, the transportation vehicle unit identifying operation 504 may include an operation 728 for identifying the one or more transportation vehicle units for transporting the one or more end users to the one or more destination locations based, at least in part, on ascertaining that the one or more transportation vehicle units do not have any package delivery obligation that would be violated if the one or more end users are transported by the one or more transportation vehicle units. For instance, the transportation vehicle unit ascertaining module 204* including the non-violating transportation vehicle unit determining module 310 of the network system 10* of FIG. 2A or 2B identifying or ascertaining the one or more transportation vehicle units 20 for transporting the one or more end users 12 to the one or more destination locations based, at least in part, on ascertaining or determining by the non-violating transportation vehicle unit determining module 310 that the one or more transportation vehicle units 20 do not have any package delivery obligation that would be violated if the one or more end users 12 are transported to the one or more destination locations by the one or more transportation vehicle units 20.

As further illustrated in FIG. 7B, in various implementations, operation 728 may further include one or more additional operations including, in some cases, an operation 729 for identifying the one or more transportation vehicle units for transporting the one or more end users to the one or more destination locations based, at least in part, on ascertaining that the one or more transportation vehicle units do not have any package delivery obligation related to an obligation for delivering one or more packages by one or more time deadlines that would be violated if the one or more end users are transported by the one or more transportation vehicle units. For instance, the transportation vehicle unit ascertaining module 204* including the non-violating transportation vehicle unit determining module 310 of the network system 10* of FIG. 2A or 2B identifying or ascertaining the one or more transportation vehicle units 20 for transporting the one or more end users 12 to the one or more destination locations based, at least in part, on ascertaining or determining by the non-violating transportation vehicle unit determining module 310 that the one or more transportation vehicle units 20 do not have any package delivery obligation related to an obligation for delivering one or more packages by one or more time deadlines that would be violated if the one or more end users 12 are transported by the one or more transportation vehicle units 20 (e.g., one or more deadlines that would be reached during transport of the one or more end users 12).

In the same or alternative implementations, operation 728 may additionally or alternatively include an operation 730 for identifying the one or more transportation vehicle units for transporting the one or more end users to the one or more destination locations based, at least in part, on ascertaining that the one or more transportation vehicle units do not have any package delivery obligation related to an obligation for delivering one or more packages to one or more specific destinations that would be violated if the one or more end users are transported by the one or more transportation vehicle units. For instance, the transportation vehicle unit ascertaining module 204* including the non-violating transportation vehicle unit determining module 310 of the network system 10* of FIG. 2A or 2B identifying or ascertaining the one or more transportation vehicle units 20 for transporting the one or more end users 12 to the one or more destination locations based, at least in part, on ascertaining or determining by the non-violating transportation vehicle unit determining module 310 that the one or more transportation vehicle units 20 do not have any package delivery obligation related to an obligation for delivering one or more packages to one or more specific destinations that would be violated if the one or more end users 12 are transported by the one or more transportation vehicle units 20. For example, if a particular transportation vehicle unit 20 has an obligation to deliver a package to a far-away delivery location by a certain deadline and if transporting the one or more end users 12 to the destination location or locations by the particular transportation vehicle unit 20 would prevent the particular transportation vehicle unit 20 to deliver the package on time, than the particular transportation vehicle unit 20 would be excluded from transporting the one or more end users 12.

In some implementations, operation 728 may further include an operation 731 for identifying the one or more transportation vehicle units for transporting the one or more end users to the one or more destination locations based, at least in part, on ascertaining that the one or more transportation vehicle units do not have any package delivery obligation related to an obligation for delivering one or more packages while in one or more specified environmental conditions. For instance, the transportation vehicle unit ascertaining module 204* including the non-violating transportation vehicle unit determining module 310 of the network system 10* of FIG. 2A or 2B identifying or ascertaining the one or more transportation vehicle units 20 for transporting the one or more end users 12 to the one or more destination locations based, at least in part, on ascertaining or determining by the non-violating transportation vehicle unit determining module 310 that the one or more transportation vehicle units 20 do not have any package delivery obligation related to an obligation for delivering one or more packages while in one or more specified environmental conditions (e.g., an obligation to deliver a package in a cool environment). For example, if a particular transportation vehicle unit 20 has packages that have to be delivered in an air-conditioned environment and a prospective customer (e.g., an end user 12) is requesting transport without air-conditioning, then the particular transportation vehicle unit 20 will not be assigned to transport the prospective customer.

Figure 7C:
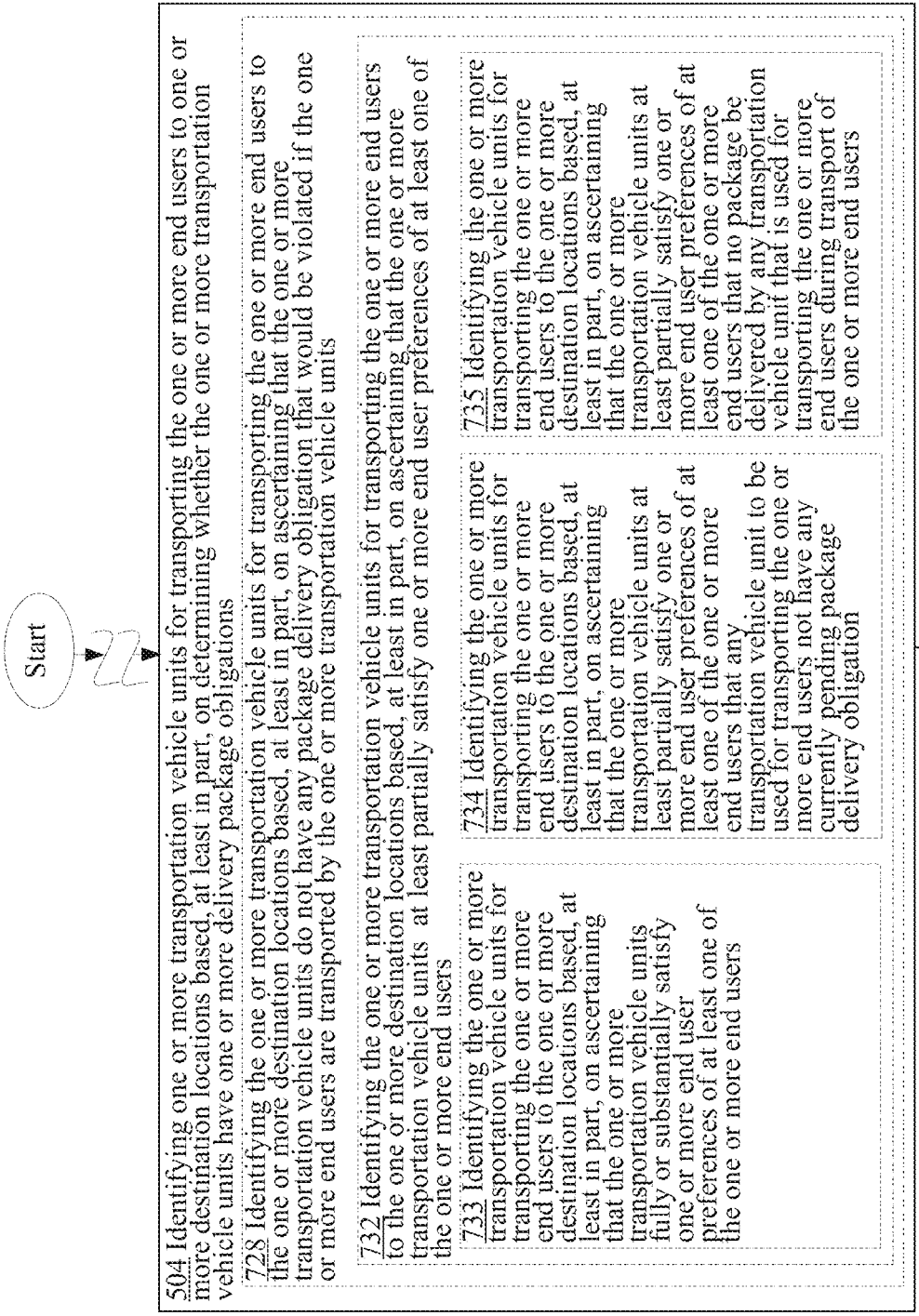
FIG. 7C is a high-level logic flowchart of a process depicting alternate implementations of the transportation vehicle unit identifying operation 504 of FIG. 5.

Turning now to FIG. 7C, in some implementations, operation 728 may further include an operation 732 for identifying the one or more transportation vehicle units for transporting the one or more end users to the one or more destination locations based, at least in part, on ascertaining that the one or more transportation vehicle units at least partially satisfy one or more end user preferences of at least one of the one or more end users. For instance, the transportation vehicle unit ascertaining module 204* including the end user preference compliant transportation vehicle unit determining module 312 (see FIG. 3B) of the network system 10* of FIG. 2A or 2B identifying or ascertaining the one or more transportation vehicle units 20 for transporting the one or more end users 12 to the one or more destination locations based, at least in part, on ascertaining or determining by the end user preference compliant transportation vehicle unit determining module 312 that the one or more transportation vehicle units 20 at least partially satisfy one or more end user preferences (e.g., transportation vehicle units 20 with high cleanness ratings from previous customers) of at least one of the one or more end users 12.

Figure 7D:
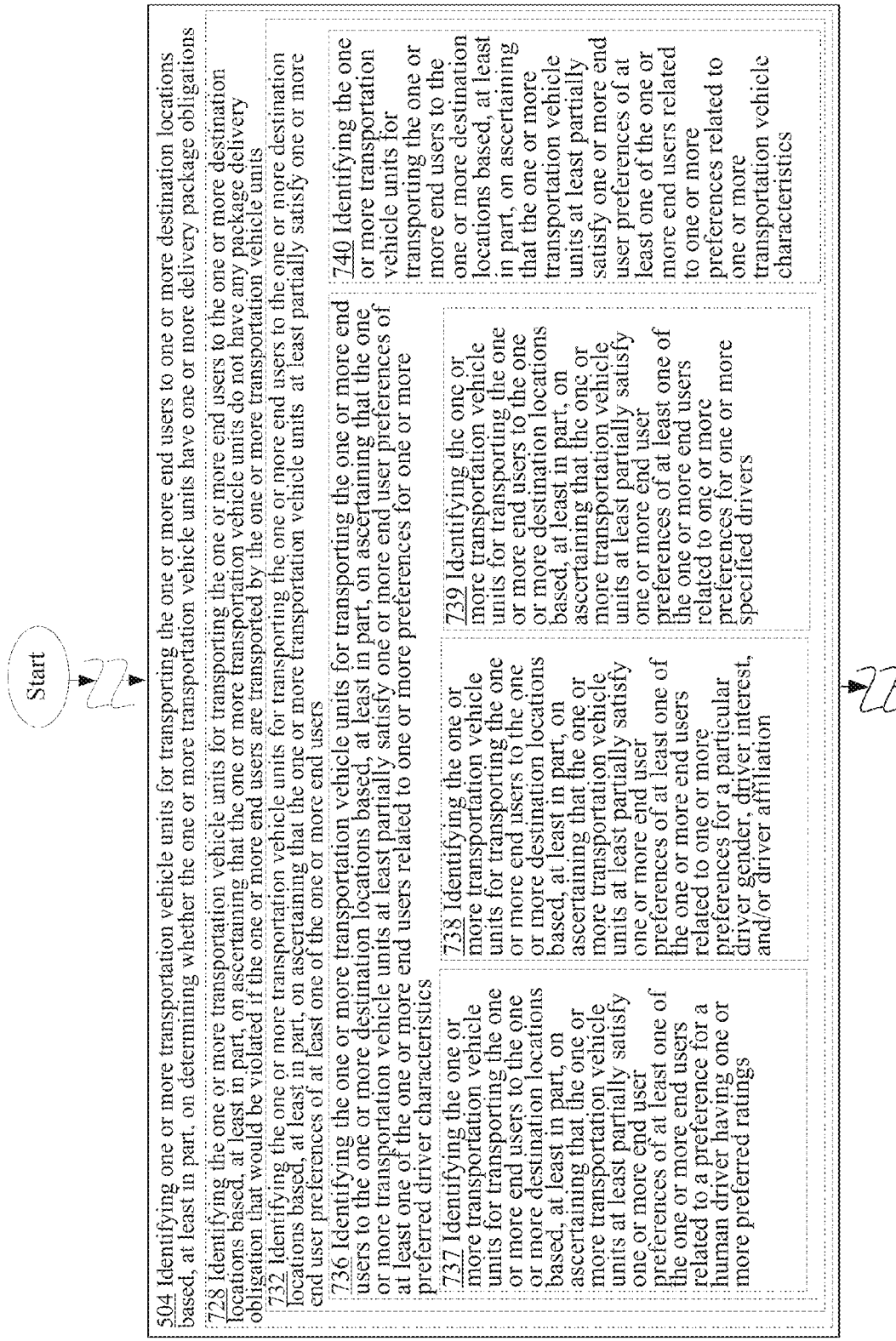
FIG. 7D is a high-level logic flowchart of a process depicting alternate implementations of the transportation vehicle unit identifying operation 504 of FIG. 5.

As further illustrated in FIGS. 7C and 7D, in various implementations, operation 732 may further include one or more additional operations including, in some cases, an operation 733 for identifying the one or more transportation vehicle units for transporting the one or more end users to the one or more destination locations based, at least in part, on ascertaining that the one or more transportation vehicle units fully or substantially satisfy one or more end user preferences of at least one of the one or more end users. For instance, the transportation vehicle unit ascertaining module 204* including the end user preference compliant transportation vehicle unit determining module 312 of the network system 10* of FIG. 2A or 2B identifying or ascertaining the one or more transportation vehicle units 20 for transporting the one or more end users 12 to the one or more destination locations based, at least in part, on ascertaining or determining by the end user preference compliant transportation vehicle unit determining module 312 that the one or more transportation vehicle units 20 fully or substantially (e.g., more than 50%) satisfy one or more end user preferences (e.g., a transportation vehicle with large leg room) of at least one of the one or more end users 12.

In the same or alternative implementations, operation 732 may additionally or alternatively include an operation 734 for identifying the one or more transportation vehicle units for transporting the one or more end users to the one or more destination locations based, at least in part, on ascertaining that the one or more transportation vehicle units at least partially satisfy one or more end user preferences of at least one of the one or more end users that any transportation vehicle unit to be used for transporting the one or more end users not have any currently pending package delivery obligation. For instance, the transportation vehicle unit ascertaining module 204* including the end user preference compliant transportation vehicle unit determining module 312 of the network system 10* of FIG. 2A or 2B identifying or ascertaining the one or more transportation vehicle units 20 for transporting the one or more end users 12 to the one or more destination locations based, at least in part, on ascertaining or determining by the end user preference compliant transportation vehicle unit determining module 312 that the one or more transportation vehicle units 20 at least partially satisfy one or more end user preferences of at least one of the one or more end users 12 that any transportation vehicle unit 20 to be used for transporting the one or more end users 12 not have any currently pending package delivery obligation (e.g., package delivery obligation to deliver a package during the day in which the one or more end users 12 are to be transported).

In the same or alternative implementations, operation 732 may additionally or alternatively include an operation 735 for identifying the one or more transportation vehicle units for transporting the one or more end users to the one or more destination locations based, at least in part, on ascertaining that the one or more transportation vehicle units at least partially satisfy one or more end user preferences of at least one of the one or more end users that no package be delivered by any transportation vehicle unit that is used for transporting the one or more end users during transport of the one or more end users. For instance, the transportation vehicle unit ascertaining module 204* including the end user preference compliant transportation vehicle unit determining module 312 of the network system 10* of FIG. 2A or 2B identifying or ascertaining the one or more transportation vehicle units 20 for transporting the one or more end users 12 to the one or more destination locations based, at least in part, on ascertaining or determining by the end user preference compliant transportation vehicle unit determining module 312 that the one or more transportation vehicle units 20 at least partially satisfy one or more end user preferences of at least one of the one or more end users 12 that no package be delivered by any transportation vehicle unit 20 that is used for transporting the one or more end users 12 during transport of the one or more end users 12.

In the same or alternative implementations, operation 732 may additionally or alternatively include an operation 736 for identifying the one or more transportation vehicle units for transporting the one or more end users to the one or more destination locations based, at least in part, on ascertaining that the one or more transportation vehicle units at least partially satisfy one or more end user preferences of at least one of the one or more end users related to one or more preferences for one or more preferred driver characteristics. For instance, the transportation vehicle unit ascertaining module 204* including the end user preference compliant transportation vehicle unit determining module 312 of the network system 10* of FIG. 2A or 2B identifying or ascertaining the one or more transportation vehicle units 20 for transporting the one or more end users 12 to the one or more destination locations based, at least in part, on ascertaining or determining by the end user preference compliant transportation vehicle unit determining module 312 that the one or more transportation vehicle units 20 at least partially satisfy one or more end user preferences of at least one of the one or more end users 12 related to one or more preferences for one or more preferred driver characteristics (e.g., preference that the human driver who will be transporting the one or more end users 12 will be associated with certain characteristics).

As further illustrated in FIG. 7D, in various implementations, operation 736 may further include one or more additional operations including, in some cases, an operation 737 for identifying the one or more transportation vehicle units for transporting the one or more end users to the one or more destination locations based, at least in part, on ascertaining that the one or more transportation vehicle units at least partially satisfy one or more end user preferences of at least one of the one or more end users related to a preference for a human driver having one or more preferred ratings. For instance, the transportation vehicle unit ascertaining module 204* including the end user preference compliant transportation vehicle unit determining module 312 of the network system 10* of FIG. 2A or 2B identifying or ascertaining the one or more transportation vehicle units 20 for transporting the one or more end users 12 to the one or more destination locations based, at least in part, on ascertaining or determining by the end user preference compliant transportation vehicle unit determining module 312 that the one or more transportation vehicle units 20 at least partially satisfy one or more end user preferences of at least one of the one or more end users 12 related to a preference for a human driver having one or more preferred ratings (e.g., preference that the human driver have an average rating, as provided by previous passenger, above a certain minimum rating—the driver rating may be related to courtesy, timeliness, driver skills, and/or other factors).

In some implementations, operation 736 may alternatively or additionally include an operation 738 for identifying the one or more transportation vehicle units for transporting the one or more end users to the one or more destination locations based, at least in part, on ascertaining that the one or more transportation vehicle units at least partially satisfy one or more end user preferences of at least one of the one or more end users related to one or more preferences for a particular driver gender, driver interest, and/or driver affiliation. For instance, the transportation vehicle unit ascertaining module 204* including the end user preference compliant transportation vehicle unit determining module 312 of the network system 10* of FIG. 2A or 2B identifying or ascertaining the one or more transportation vehicle units 20 for transporting the one or more end users 12 to the one or more destination locations based, at least in part, on ascertaining or determining by the end user preference compliant transportation vehicle unit determining module 312 that the one or more transportation vehicle units 20 at least partially satisfy one or more end user preferences of at least one of the one or more end users 12 related to one or more preferences for a particular driver gender (e.g., male), driver interest (e.g., Boston Red Sox), and/or driver affiliation (e.g., religious or social organization).

In some implementations, operation 736 may alternatively or additionally include an operation 739 for identifying the one or more transportation vehicle units for transporting the one or more end users to the one or more destination locations based, at least in part, on ascertaining that the one or more transportation vehicle units at least partially satisfy one or more end user preferences of at least one of the one or more end users related to one or more preferences for one or more specified drivers. For instance, the transportation vehicle unit ascertaining module 204* including the end user preference compliant transportation vehicle unit determining module 312 of the network system 10* of FIG. 2A or 2B identifying or ascertaining the one or more transportation vehicle units 20 for transporting the one or more end users 12 to the one or more destination locations based, at least in part, on ascertaining or determining by the end user preference compliant transportation vehicle unit determining module 312 that the one or more transportation vehicle units 20 at least partially satisfy one or more end user preferences of at least one of the one or more end users 12 related to one or more preferences for one or more specified drivers (e.g., preference for one or more pre-approved human drivers as indicated by one of the one or more end users 12).

In some implementations, operation 732 for identifying the one or more transportation vehicle units for transporting the one or more end users to the one or more destination locations based, at least in part, on ascertaining that the one or more transportation vehicle units at least partially satisfy one or more end user preferences of at least one of the one or more end users related to one or more preferences for one or more preferred driver characteristics may alternatively or additionally include an operation 740 for identifying the one or more transportation vehicle units for transporting the one or more end users to the one or more destination locations based, at least in part, on ascertaining that the one or more transportation vehicle units at least partially satisfy one or more end user preferences of at least one of the one or more end users related to one or more preferences related to one or more transportation vehicle characteristics. For instance, the transportation vehicle unit ascertaining module 204* including the end user preference compliant transportation vehicle unit determining module 312 of the network system 10* of FIG. 2A or 2B identifying or ascertaining the one or more transportation vehicle units 20 for transporting the one or more end users 12 to the one or more destination locations based, at least in part, on ascertaining or determining by the end user preference compliant transportation vehicle unit determining module 312 that the one or more transportation vehicle units 20 at least partially satisfy one or more end user preferences of at least one of the one or more end users 12 related to one or more preferences related to one or more transportation vehicle characteristics (e.g., model, leg room, luggage space, non-smoking, smoking permissible, and so forth).

Figure 7E:
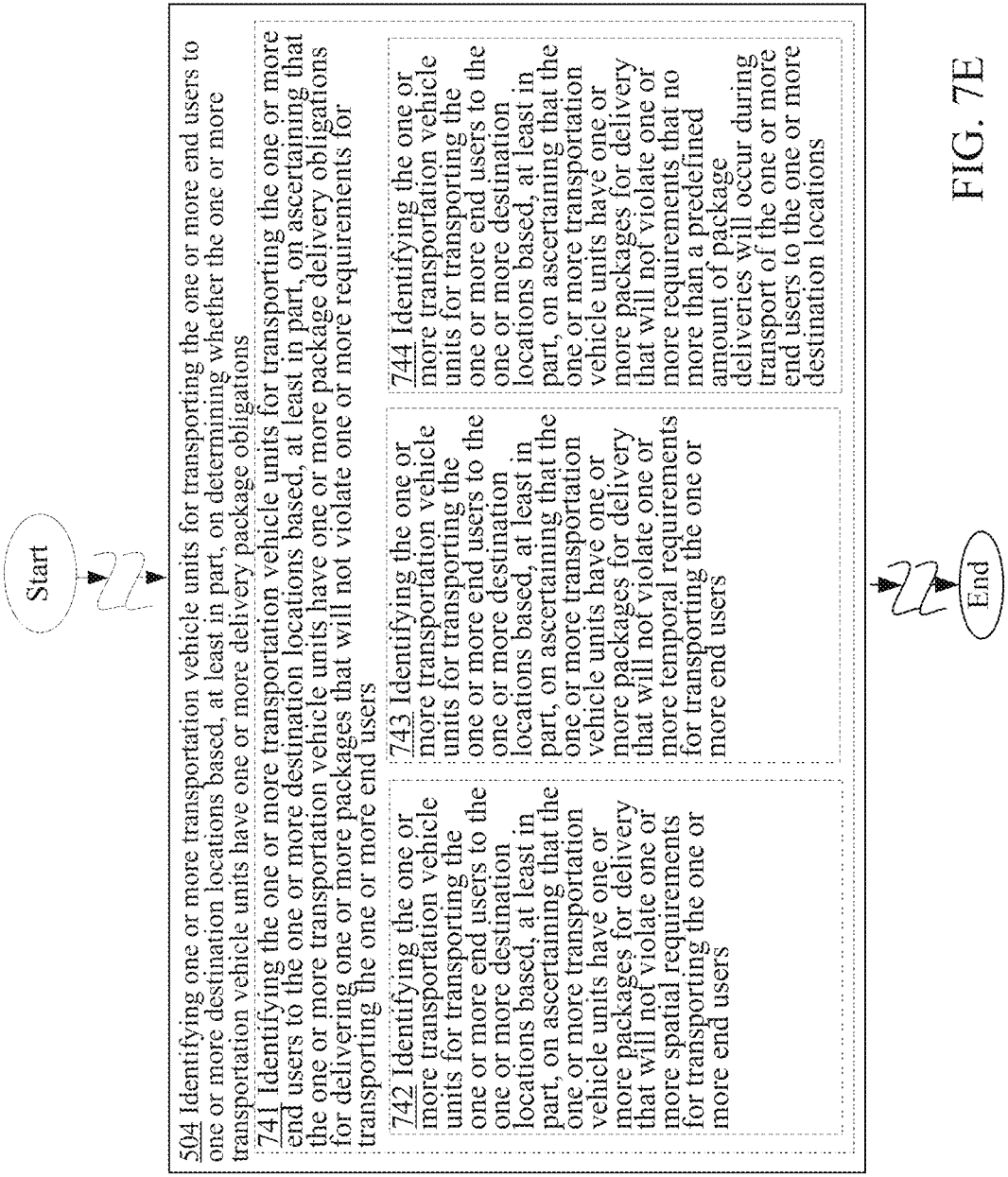
FIG. 7E is a high-level logic flowchart of a process depicting alternate implementations of the transportation vehicle unit identifying operation 504 of FIG. 5.

Referring now to FIG. 7E, the transportation vehicle unit identifying operation 504 may include an operation 741 for identifying the one or more transportation vehicle units for transporting the one or more end users to the one or more destination locations based, at least in part, on ascertaining that the one or more transportation vehicle units have one or more package delivery obligations for delivering one or more packages that will not violate one or more requirements for transporting the one or more end users. For instance, the transportation vehicle unit ascertaining module 204* including the end user transport requirement compliant determining module 314 (see FIG. 3B) of the network system 10* of FIG. 2A or 2B identifying or ascertaining the one or more transportation vehicle units 20 for transporting the one or more end users 12 to the one or more destination locations based, at least in part, on ascertaining or determining by the end user transport requirement compliant determining module 314 that the one or more transportation vehicle units 20 have one or more package delivery obligations for delivering one or more packages that will not violate one or more requirements for transporting the one or more end users 12. For example, finding a transportation vehicle unit 20 that is not carrying any packages that requires air conditioning when the one or more end users 12 are requesting no air conditioning.

In some implementations, operation 741 may include an operation 742 for identifying the one or more transportation vehicle units for transporting the one or more end users to the one or more destination locations based, at least in part, on ascertaining that the one or more transportation vehicle units have one or more packages for delivery that will not violate one or more spatial requirements for transporting the one or more end users. For instance, the transportation vehicle unit ascertaining module 204* including the end user transport requirement compliant determining module 314 of the network system 10* of FIG. 2A or 2B identifying or ascertaining the one or more transportation vehicle units 20 for transporting the one or more end users 12 to the one or more destination locations based, at least in part, on ascertaining or determining that the one or more transportation vehicle units 20 have one or more packages for delivery that will not violate one or more spatial requirements (e.g., luggage space requirements, passenger space requirements, etc.) for transporting the one or more end users 12.

In some implementations, operation 741 may include an operation 743 for identifying the one or more transportation vehicle units for transporting the one or more end users to the one or more destination locations based, at least in part, on ascertaining that the one or more transportation vehicle units have one or more packages for delivery that will not violate one or more temporal requirements for transporting the one or more end users. For instance, the transportation vehicle unit ascertaining module 204* including the end user transport requirement compliant determining module 314 of the network system 10* of FIG. 2A or 2B identifying or ascertaining the one or more transportation vehicle units 20 for transporting the one or more end users 12 to the one or more destination locations based, at least in part, on ascertaining or determining by the end user transport requirement compliant determining module 314 that the one or more transportation vehicle units 20 have one or more packages for delivery that will not violate one or more temporal requirements for transporting the one or more end users 12. For example, if the one or more end users 12 need to be at a particular destination by a certain time and if a particular transportation vehicle unit 20 has package delivery obligations that would prevent the timely transport of the one or more end users 12 to the destination location, then that particular transportation vehicle unit 20 will not be selected for transporting the one or more end users 12.

In some implementations, operation 741 may include an operation 744 for identifying the one or more transportation vehicle units for transporting the one or more end users to the one or more destination locations based, at least in part, on ascertaining that the one or more transportation vehicle units have one or more packages for delivery that will not violate one or more requirements that no more than a predefined amount of package deliveries will occur during transport of the one or more end users to the one or more destination locations. For instance, the transportation vehicle unit ascertaining module 204* including the end user transport requirement compliant determining module 314 of the network system 10* of FIG. 2A or 2B identifying or ascertaining the one or more transportation vehicle units 20 for transporting the one or more end users 12 to the one or more destination locations based, at least in part, on ascertaining or determining by the end user transport requirement compliant determining module 314 that the one or more transportation vehicle units 20 have one or more packages for delivery that will not violate one or more requirements that no more than a predefined amount of package deliveries (e.g., one package delivery) will occur during transport of the one or more end users 12 to the one or more destination locations.

In some implementations, operation 741 may include an operation 745 for identifying the one or more transportation vehicle units for transporting the one or more end users to the one or more destination locations based, at least in part, on ascertaining that the one or more transportation vehicle units have one or more packages for delivery to one or more delivery locations that are along or proximate to a direct route to the one or more destination locations from a rendezvous location where the one or more end users rendezvous with the one or more transportation vehicle units in order to be transported to the one or more destination locations as illustrated in FIG. 7F. For instance, the transportation vehicle unit ascertaining module 204* including the end user transport requirement compliant determining module 314 of the network system 10* of FIG. 2A or 2B identifying or ascertaining the one or more transportation vehicle units 20 for transporting the one or more end users 12 to the one or more destination locations based, at least in part, on ascertaining or determining by the end user transport requirement compliant determining module 314 that the one or more transportation vehicle units 20 have one or more packages for delivery to one or more delivery locations that are along or proximate (e.g., within ¼ mile) to a direct (e.g., most efficient or fastest) route to the one or more destination locations from a rendezvous location where the one or more end users 12 rendezvous with the one or more transportation vehicle units 20 in order to be transported to the one or more destination locations. For example, only packages that are to be delivered along the direct route to the destination location may be allowed to be delivered during transport of the one or more end users 12.

As further illustrated in FIG. 7F, in various implementations, operation 745 may include one or more additional operations including, in some cases, an operation 746 for identifying the one or more transportation vehicle units for transporting the one or more end users to the one or more destination locations based, at least in part, on ascertaining that the one or more transportation vehicle units have one or more packages for delivery to one or more delivery locations that are along or proximate to a direct route that is the shortest distance route to the one or more destination locations from the rendezvous location. For instance, the transportation vehicle unit ascertaining module 204* including the end user transport requirement compliant determining module 314 of the network system 10* of FIG. 2A or 2B identifying or ascertaining the one or more transportation vehicle units 20 for transporting the one or more end users 12 to the one or more destination locations based, at least in part, on ascertaining or determining by the end user transport requirement compliant determining module 314 that the one or more transportation vehicle units 20 have one or more packages for delivery to one or more delivery locations that are along or proximate to a direct route that is the shortest distance route to the one or more destination locations from the rendezvous location where the one or more end users 12 will rendezvous with the one or more transportation vehicle units 20.

In some implementations, operation 745 may actually include an operation 747 for identifying the one or more transportation vehicle units for transporting the one or more end users to the one or more destination locations based, at least in part, on ascertaining that the one or more transportation vehicle units have one or more packages for delivery to one or more delivery locations that are along or proximate to a direct route that is the most time efficient route to the one or more destination locations from the rendezvous location. For instance, the transportation vehicle unit ascertaining module 204* including the end user transport requirement compliant determining module 314 of the network system 10* of FIG. 2A or 2B identifying or ascertaining the one or more transportation vehicle units 20 for transporting the one or more end users 12 to the one or more destination locations based, at least in part, on ascertaining or determining by the end user transport requirement compliant determining module 314 that the one or more transportation vehicle units 20 have one or more packages for delivery to one or more delivery locations that are along or proximate to a direct route that is the most time efficient route (e.g., fastest route) to the one or more destination locations from the rendezvous location.

In some implementations, operation 745 may actually include an operation 748 for identifying the one or more transportation vehicle units for transporting the one or more end users to the one or more destination locations based, at least in part, on ascertaining that the one or more transportation vehicle units have one or more packages for delivery to one or more delivery locations that do not add more than a predefined amount of time to the total amount of time it would have taken to transport the one or more end users to the one or more destination locations using the direct route and when no packages are being delivered during the transport of the one or more end users to the one or more destination locations. For instance, the transportation vehicle unit ascertaining module 204* including the end user transport requirement compliant determining module 314 of the network system 10* of FIG. 2A or 2B identifying or ascertaining the one or more transportation vehicle units 20 for transporting the one or more end users 12 to the one or more destination locations based, at least in part, on ascertaining or determining by the end user transport requirement compliant determining module 314 that the one or more transportation vehicle units 20 have one or more packages for delivery to one or more delivery locations that do not add more than a predefined amount of time (e.g., 15 minutes) to the total amount of time it would have taken to transport the one or more end users 12 to the one or more destination locations using the direct route and when no packages are being delivered during the transport of the one or more end users 12 to the one or more destination locations. In some cases, such information may be used in order to determine which packages may be delivered during the transport of the one or more end users 12. That is, only those package deliveries that will not add significant transport time of the one or more end users 12 may be allowed during the actual transport of the one or more end users 12.

Figure 7G:
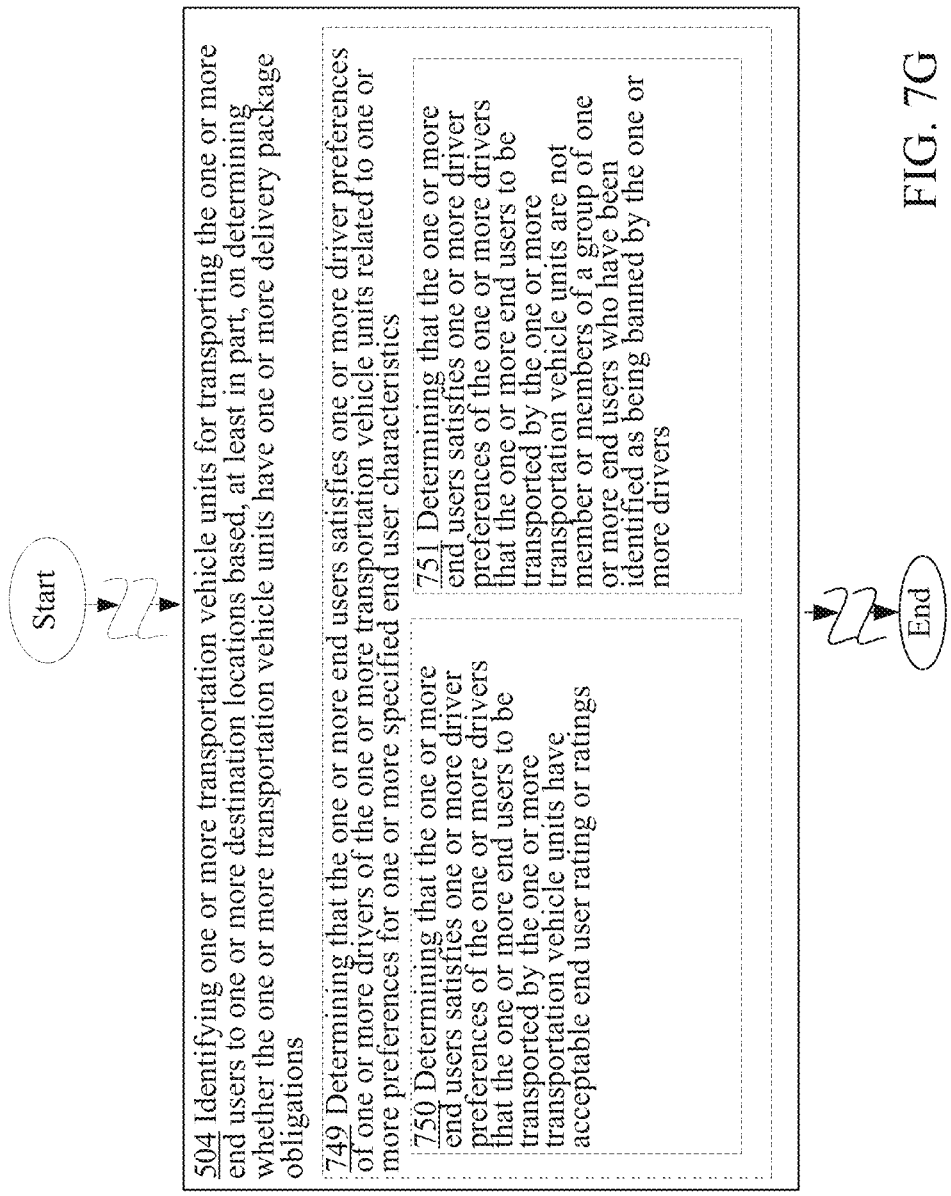
FIG. 7G is a high-level logic flowchart of a process depicting alternate implementations of the transportation vehicle unit identifying operation 504 of FIG. 5.

Turning to FIG. 7G, in various implementations, the transportation vehicle unit identifying operation 504 may include an operation 749 for determining that the one or more end users satisfies one or more driver preferences of one or more drivers of the one or more transportation vehicle units related to one or more preferences for one or more specified end user characteristics. For instance, the driver preference compliant determining module 316 (see FIG. 3B) of the network system 10* of FIG. 2A or 2B determining that the one or more end users 12 satisfies one or more driver preferences of one or more drivers (e.g., vehicle operators) of the one or more transportation vehicle units 20 related to one or more preferences for one or more specified end user characteristics (e.g., non-smokers, male passengers only, etc.).

In some implementations, operation 749 may, in turn, further include an operation 750 for determining that the one or more end users satisfies one or more driver preferences of the one or more drivers that the one or more end users to be transported by the one or more transportation vehicle units have acceptable end user rating or ratings. For instance, the driver preference compliant determining module 316 of the network system 10* of FIG. 2A or 2B determining that the one or more end users 12 satisfies one or more driver preferences of the one or more drivers that the one or more end users 12 to be transported by the one or more transportation vehicle units 20 have acceptable end user rating or ratings (e.g., ratings of passengers as provided by other drivers).

In the same or different implementations, operation 749 may additionally or alternatively include an operation 751 for determining that the one or more end users satisfies one or more driver preferences of the one or more drivers that the one or more end users to be transported by the one or more transportation vehicle units are not member or members of a group of one or more end users who have been identified as being banned by the one or more drivers. For instance, the driver preference compliant determining module 316 of the network system 10* of FIG. 2A or 2B determining that the one or more end users 12 satisfies one or more driver preferences of the one or more drivers that the one or more end users 12 to be transported by the one or more transportation vehicle units 20 are not member or members of a group of one or more end users 12 who have been identified as being banned for transport by the one or more drivers.

Figure 8A:
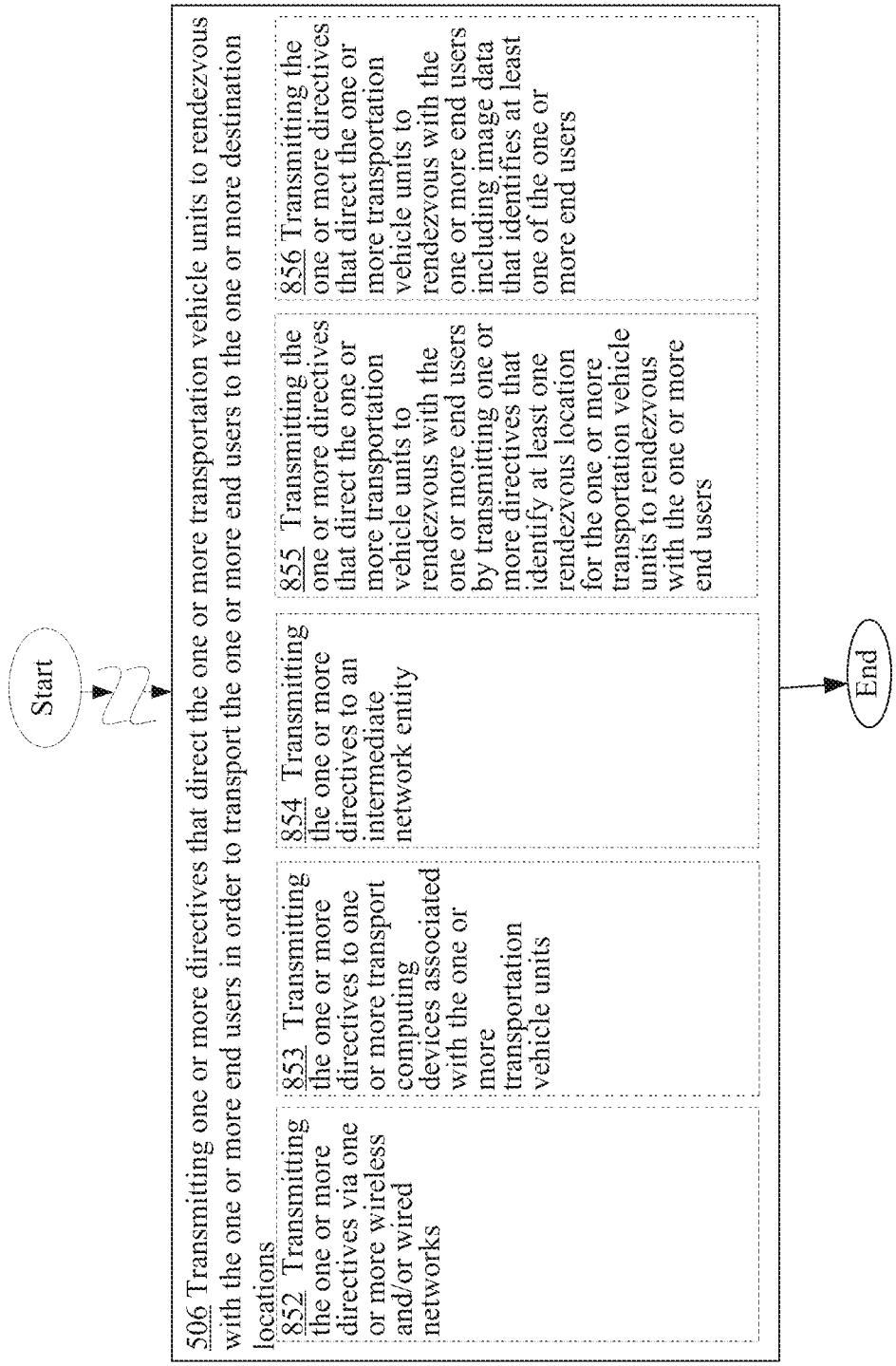
FIG. 8A is a high-level logic flowchart of a process depicting alternate implementations of the directive transmitting operation 506 of FIG. 5.
Figure 8B:
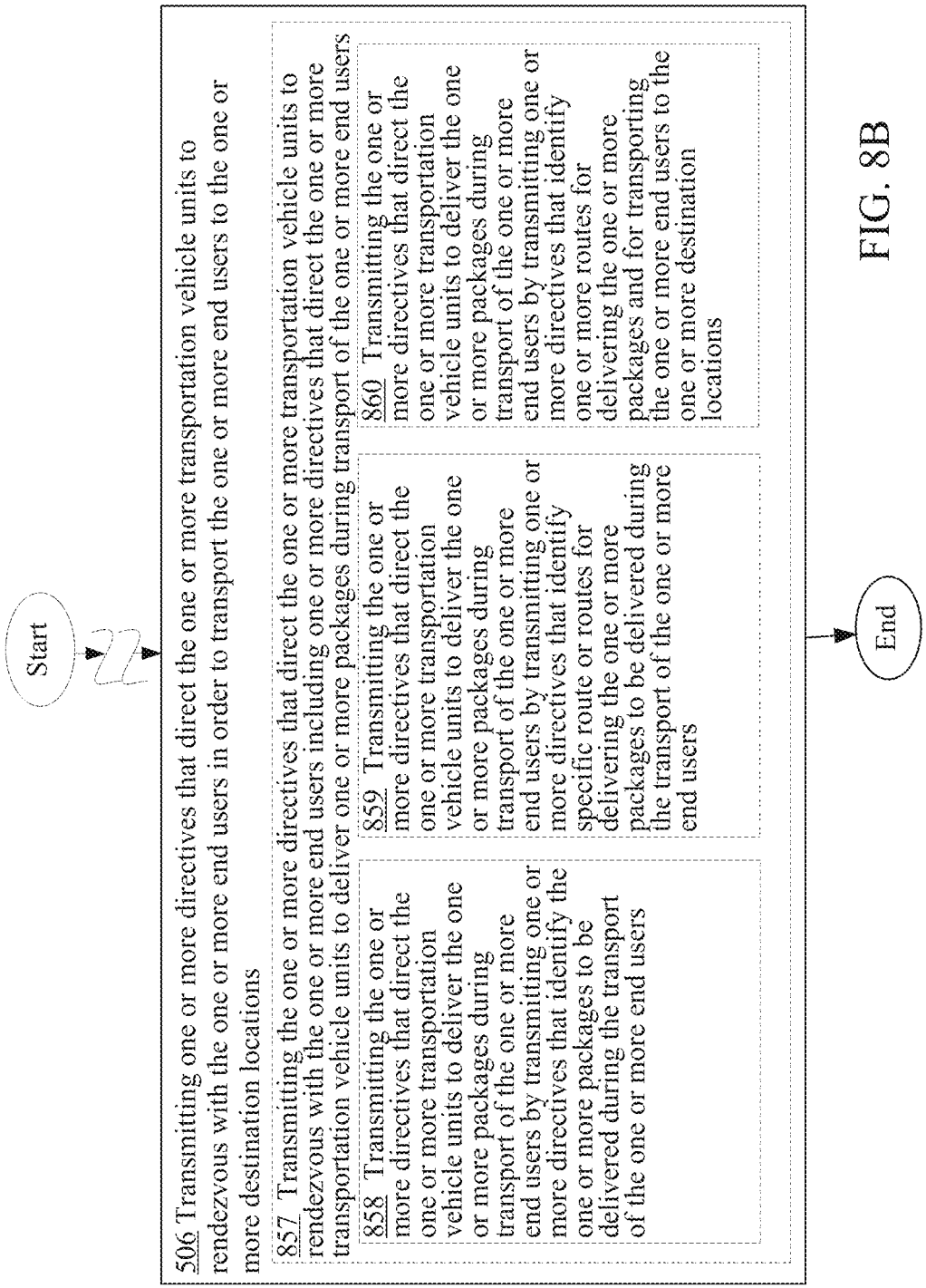
FIG. 8B is a high-level logic flowchart of a process depicting alternate implementations of the directive transmitting operation 506 of FIG. 5.

Referring back to the directive transmitting operation 506 of FIG. 5, the directive transmitting operation 506 similar to the transport request receiving operation 502 and the transportation vehicle unit identifying operation 504 of FIG. 5 may be executed in a number of different ways in various alternative embodiments as illustrated, for example, in FIGS. 8A and 8B. In some cases, for example, the directive transmitting operation 506 may actually include an operation 852 for transmitting the one or more directives via one or more wireless and/or wired networks. For instance, the directive transmitting module 206* of the network system 10* of FIG. 2A or 2B transmitting the one or more directives via one or more wireless and/or wired networks 18.

In the same or different implementations, the directive transmitting operation 506 may additionally or alternatively include an operation 853 for transmitting the one or more directives to one or more transport computing devices associated with the one or more transportation vehicle units. For instance, the directive transmitting module 206* of the network system 10* of FIG. 2A or 2B transmitting the one or more directives to one or more transport computing devices (e.g., a dedicated computing device or a mobile device such as a Smartphone or tablet computer) associated with the one or more transportation vehicle units 20.

In the same or different implementations, the directive transmitting operation 506 may additionally or alternatively include an operation 854 for transmitting the one or more directives to an intermediate network entity. For instance, the directive transmitting module 206* of the network system 10* of FIG. 2A or 2B transmitting the one or more directives to an intermediate network entity 16 (e.g., a third party server or workstation that may be in further communication with one or more transport computing devices associated with the one or more transportation vehicle units 20).

In the same or different implementations, the directive transmitting operation 506 may additionally or alternatively include an operation 855 for transmitting the one or more directives that direct the one or more transportation vehicle units to rendezvous with the one or more end users by transmitting one or more directives that identify at least one rendezvous location for the one or more transportation vehicle units to rendezvous with the one or more end users. For instance, the directive transmitting module 206* of the network system 10* of FIG. 2A or 2B transmitting the one or more directives that direct the one or more transportation vehicle units 20 to rendezvous with the one or more end users 12 by transmitting one or more directives that identify at least one rendezvous location for the one or more transportation vehicle units 20 to rendezvous with the one or more end users 12.

In the same or different implementations, the directive transmitting operation 506 may additionally or alternatively include an operation 856 for transmitting the one or more directives that direct the one or more transportation vehicle units to rendezvous with the one or more end users including image data that identifies at least one of the one or more end users. For instance, the directive transmitting module 206* of the network system 10* of FIG. 2A or 2B transmitting the one or more directives that direct the one or more transportation vehicle units 20 to rendezvous with the one or more end users including transmitting image data (e.g., facial image data) that identifies at least one of the one or more end users 12.

In the same or different implementations, the directive transmitting operation 506 may additionally or alternatively include an operation 857 for transmitting the one or more directives that direct the one or more transportation vehicle units to rendezvous with the one or more end users including one or more directives that direct the one or more transportation vehicle units to deliver one or more packages during transport of the one or more end users. For instance, the directive transmitting module 206* of the network system 10* of FIG. 2A or 2B transmitting the one or more directives that direct the one or more transportation vehicle units 20 to rendezvous with the one or more end users 12 including one or more directives that direct the one or more transportation vehicle units 20 to deliver one or more packages during transport of the one or more end users 12. For example, the one or more directives may identify which of multiple packages that a transportation vehicle unit 20 is carrying may be delivered during the transport of the one or more end users 12. The one or more packages that are selected for delivery may be selected based on a number of factors including, for example, determination that the one or more packages are to be delivered to delivery locations that are along or proximate to the direct route to the destination location or locations of the one or more end users 12, an end user preference that only a limited number of packages be delivered during transport of the one or more end users 12, and so forth.

As further illustrated in FIG. 8B, in some implementations, operation 857 may further include an operation 858 for transmitting the one or more directives that direct the one or more transportation vehicle units to deliver the one or more packages during transport of the one or more end users by transmitting one or more directives that identify the one or more packages to be delivered during the transport of the one or more end users. For instance, the directive transmitting module 206* of the network system 10* of FIG. 2A or 2B transmitting the one or more directives that direct the one or more transportation vehicle units 20 to deliver the one or more packages during transport of the one or more end users 12 by transmitting one or more directives that identify the one or more packages to be delivered during the transport of the one or more end users 12. In some cases, the directives may or may not identify the package delivery locations of the one or more packages.

In the same or alternative implementations, operation 857 may additionally or alternatively include an operation 859 for transmitting the one or more directives that direct the one or more transportation vehicle units to deliver the one or more packages during transport of the one or more end users by transmitting one or more directives that identify specific route or routes for delivering the one or more packages to be delivered during the transport of the one or more end users. For instance, the directive transmitting module 206* of the network system 10* of FIG. 2A or 2B transmitting the one or more directives that direct the one or more transportation vehicle units 20 to deliver the one or more packages during transport of the one or more end users 12 by transmitting one or more directives that identify specific route or routes for delivering the one or more packages to be delivered during the transport of the one or more end users 12.

In the same or alternative implementations, operation 857 may additionally or alternatively include an operation 860 for transmitting the one or more directives that direct the one or more transportation vehicle units to deliver the one or more packages during transport of the one or more end users by transmitting one or more directives that identify one or more routes for delivering the one or more packages and for transporting the one or more end users to the one or more destination locations. For instance, the directive transmitting module 206* of the network system 10* of FIG. 2A or 2B transmitting the one or more directives that direct the one or more transportation vehicle units 20 to deliver the one or more packages during transport of the one or more end users 12 by transmitting one or more directives that identify one or more routes for delivering the one or more packages and for transporting the one or more end users 12 to the one or more destination locations.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method, comprising:
    receiving a request for transporting one or more end users;
    identifying one or more transportation vehicle units for transporting the one or more end users to one or more destination locations based, at least in part, on a determination by a processor, whether the one or more transportation vehicle units have one or more package delivery obligations; and
    transmitting one or more directives that direct the one or more transportation vehicle units to rendezvous with the one or more end users in order to transport the one or more end users to the one or more destination locations.

2. A computationally-implemented system, comprising:
    at least one computing device; and
    one or more instructions that, when implemented in the at least one computing device, program the at least one computing device for:
        receiving a request for transporting one or more end users;
        identifying one or more transportation vehicle units for transporting the one or more end users to one or more destination locations based, at least in part, on determining whether the one or more transportation vehicle units have one or more package delivery obligations; and
        transmitting one or more directives that direct the one or more transportation vehicle units to rendezvous with the one or more end users in order to transport the one or more end users to the one or more destination locations.

3. The computationally-implemented system of claim 2, wherein receiving a request for transporting one or more end users comprises:
    receiving end user preference data that indicates one or more end user preferences of at least one of the one or more end users.

4. The computationally-implemented system of claim 3, wherein receiving end user preference data that indicates one or more end user preferences of at least one of the one or more end users comprises:
    receiving end user preference data that indicates one or more end user preferences that a transportation vehicle unit to be used for transporting the one or more end users does not have any currently pending package delivery obligation.

5. The computationally-implemented system of claim 3, wherein receiving end user preference data that indicates one or more end user preferences of at least one of the one or more end users comprises:
    receiving end user preference data that indicates one or more end user preferences that no package be delivered by a transportation vehicle unit that is used for transporting the one or more end users during transport of the one or more end users.

6. The computationally-implemented system of claim 3, wherein receiving end user preference data that indicates one or more end user preferences of at least one of the one or more end users comprises:

receiving end user preference data that indicates one or more end user preferences that if one or more packages are to be delivered by a transportation vehicle unit during transport of the one or more end users then a reduced transportation fee be charged for transporting the one or more end users that is a discounted fee reduced from a fee that would be charged for transporting the one or more end users when no packages are delivered during the transport of the one or more end users.

7. The computationally-implemented system of claim 2, wherein receiving a request for transporting one or more end users comprises:
receiving a request for transporting one or more end users including passenger rating data indicating one or more ratings associated with at least one of the one or more end users.

8. The computationally-implemented system of claim 2, wherein identifying one or more transportation vehicle units for transporting the one or more end users to one or more destination locations based, at least in part, on determining whether the one or more transportation vehicle units have one or more package delivery obligations comprises:
identifying a presence of one or more transportation vehicle units that are available for transporting the one or more end users in proximate vicinity of a rendezvous location for rendezvousing with the one or more end users.

9. The computationally-implemented system of claim 8, wherein identifying a presence of one or more transportation vehicle units that are available for transporting the one or more end users in proximate vicinity of a rendezvous location for rendezvousing with the one or more end users comprises:
identifying a presence of one or more transportation vehicle units that are currently not carrying any passengers or that are about to be free of any passenger load in proximate vicinity of the rendezvous location for rendezvousing with the one or more end users.

10. The computationally-implemented system of claim 8, wherein identifying a presence of one or more transportation vehicle units that are available for transporting the one or more end users in proximate vicinity of a rendezvous location for rendezvousing with the one or more end users comprises:
identifying a presence of one or more transportation vehicle units in proximate vicinity of the rendezvous location that do not have any package delivery obligation that would be violated if the one or more end users are transported by the one or more transportation vehicle units.

11. The computationally-implemented system of claim 10, wherein identifying a presence of one or more transportation vehicle units in proximate vicinity of the rendezvous location that do not have any package delivery obligation that would be violated if the one or more end users are transported by the one or more transportation vehicle units comprises:
identifying a presence of one or more transportation vehicle units that do not have any package delivery obligation that would be violated if the one or more end users are transported by the one or more available transportation vehicle units and that are in full or substantial compliance with one or more end user preferences.

12. The computationally-implemented system of claim 2, wherein identifying one or more transportation vehicle units for transporting the one or more end users to one or more destination locations based, at least in part, on determining whether the one or more transportation vehicle units have one or more package delivery obligations comprises:
identifying one or more transportation vehicle units for transporting the one or more end users to one or more destination locations based, at least in part, on ascertaining that the one or more transportation vehicle units do not have any current package delivery obligations.

13. The computationally-implemented system of claim 2, wherein identifying one or more transportation vehicle units for transporting the one or more end users to one or more destination locations based, at least in part, on determining whether the one or more transportation vehicle units have one or more package delivery obligations comprises:
identifying one or more transportation vehicle units for transporting the one or more end users to one or more destination locations based, at least in part, on ascertaining that the one or more transportation vehicle units do not have any package delivery obligation that would be violated if the one or more end users are transported by the one or more transportation vehicle units.

14. The computationally-implemented system of claim 13, wherein identifying one or more transportation vehicle units for transporting the one or more end users to one or more destination locations based, at least in part, on ascertaining that the one or more transportation vehicle units do not have any package delivery obligation that would be violated if the one or more end users are transported by the one or more transportation vehicle units comprises:
identifying one or more transportation vehicle units for transporting the one or more end users to one or more destination locations based, at least in part, on ascertaining that the one or more transportation vehicle units do not have any package delivery obligation related to an obligation for delivering one or more packages by one or more time deadlines that would be violated if the one or more end users are transported by the one or more transportation vehicle units.

15. The computationally-implemented system of claim 13, wherein identifying one or more transportation vehicle units for transporting the one or more end users to one or more destination locations based, at least in part, on ascertaining that the one or more transportation vehicle units do not have any package delivery obligation that would be violated if the one or more end users are transported by the one or more transportation vehicle units comprises:
identifying one or more transportation vehicle units for transporting the one or more end users to one or more destination locations based, at least in part, on ascertaining that the one or more transportation vehicle units do not have any package delivery obligation related to an obligation for delivering one or more packages to one or more specific destinations that would be violated if the one or more end users are transported by the one or more transportation vehicle units.

16. The computationally-implemented system of claim 13, wherein identifying one or more transportation vehicle units for transporting the one or more end users to one or more destination locations based, at least in part, on ascertaining that the one or more transportation vehicle units do not have any package delivery obligation that would be violated if the one or more end users are transported by the one or more transportation vehicle units comprises:
identifying one or more transportation vehicle units for transporting the one or more end users to one or more destination locations based, at least in part, on ascertaining that the one or more transportation vehicle units do not have any package delivery obligation related to an obligation for delivering one or more packages while in one or more specified environmental conditions.

17. The computationally-implemented system of claim 13, wherein identifying one or more transportation vehicle units for transporting the one or more end users to one or more destination locations based, at least in part, on ascertaining that the one or more transportation vehicle units do not have any package delivery obligation that would be violated if the one or more end users are transported by the one or more transportation vehicle units comprises:
　identifying one or more transportation vehicle units for transporting the one or more end users to one or more destination locations based, at least in part, on ascertaining that the one or more transportation vehicle units at least partially satisfy one or more end user preferences of at least one of the one or more end users.

18. The computationally-implemented system of claim 17, wherein identifying one or more transportation vehicle units for transporting the one or more end users to one or more destination locations based, at least in part, on ascertaining that the one or more transportation vehicle units at least partially satisfy one or more end user preferences of at least one of the one or more end users comprises:
　identifying one or more transportation vehicle units for transporting the one or more end users to one or more destination locations based, at least in part, on ascertaining that the one or more transportation vehicle units at least partially satisfy one or more end user preferences of at least one of the one or more end users that any transportation vehicle unit to be used for transporting the one or more end users not have any currently pending package delivery obligation.

19. The computationally-implemented system of claim 17, wherein identifying one or more transportation vehicle units for transporting the one or more end users to one or more destination locations based, at least in part, on ascertaining that the one or more transportation vehicle units at least partially satisfy one or more end user preferences of at least one of the one or more end users comprises:
　identifying one or more transportation vehicle units for transporting the one or more end users to one or more destination locations based, at least in part, on ascertaining that the one or more transportation vehicle units at least partially satisfy one or more end user preferences of at least one of the one or more end users that no package be delivered by any transportation vehicle unit that is used for transporting the one or more end users during transport of the one or more end users.

20. The computationally-implemented system of claim 17, wherein identifying one or more transportation vehicle units for transporting the one or more end users to one or more destination locations based, at least in part, on ascertaining that the one or more transportation vehicle units at least partially satisfy one or more end user preferences of at least one of the one or more end users comprises:
　identifying one or more transportation vehicle units for transporting the one or more end users to one or more destination locations based, at least in part, on ascertaining that the one or more transportation vehicle units at least partially satisfy one or more end user preferences of at least one of the one or more end users related to one or more preferences for one or more preferred driver characteristics.

21. The computationally-implemented system of claim 20, wherein identifying one or more transportation vehicle units for transporting the one or more end users to one or more destination locations based, at least in part, on ascertaining that the one or more transportation vehicle units at least partially satisfy one or more end user preferences of at least one of the one or more end users related to one or more preferences for one or more preferred driver characteristics comprises:
　identifying one or more transportation vehicle units for transporting the one or more end users to one or more destination locations based, at least in part, on ascertaining that the one or more transportation vehicle units at least partially satisfy one or more end user preferences of at least one of the one or more end users related to a preference for a human driver having one or more preferred ratings.

22. The computationally-implemented system of claim 2, wherein identifying one or more transportation vehicle units for transporting the one or more end users to one or more destination locations based, at least in part, on determining whether the one or more transportation vehicle units have one or more package delivery obligations comprises:
　identifying one or more transportation vehicle units for transporting the one or more end users to one or more destination locations based, at least in part, on ascertaining that the one or more transportation vehicle units have one or more package delivery obligations for delivering one or more packages that will not violate one or more requirements for transporting the one or more end users.

23. The computationally-implemented system of claim 22, wherein identifying one or more transportation vehicle units for transporting the one or more end users to one or more destination locations based, at least in part, on ascertaining that the one or more transportation vehicle units have one or more package delivery obligations for delivering one or more packages that will not violate one or more requirements for transporting the one or more end users comprises:
　identifying one or more transportation vehicle units for transporting the one or more end users to one or more destination locations based, at least in part, on ascertaining that the one or more transportation vehicle units have one or more packages for delivery that will not violate one or more spatial requirements for transporting the one or more end users.

24. The computationally-implemented system of claim 22, wherein identifying one or more transportation vehicle units for transporting the one or more end users to one or more destination locations based, at least in part, on ascertaining that the one or more transportation vehicle units have one or more package delivery obligations for delivering one or more packages that will not violate one or more requirements for transporting the one or more end users comprises:
　identifying one or more transportation vehicle units for transporting the one or more end users to one or more destination locations based, at least in part, on ascertaining that the one or more transportation vehicle units have one or more packages for delivery that will not violate one or more temporal requirements for transporting the one or more end users.

25. The computationally-implemented system of claim 22, wherein identifying one or more transportation vehicle units for transporting the one or more end users to one or more destination locations based, at least in part, on ascertaining that the one or more transportation vehicle units have one or more package delivery obligations for delivering one or more packages that will not violate one or more requirements for transporting the one or more end users comprises:

identifying one or more transportation vehicle units for transporting the one or more end users to one or more destination locations based, at least in part, on ascertaining that the one or more transportation vehicle units have one or more packages for delivery that will not violate one or more requirements that no more than a predefined amount of package deliveries will occur during transport of the one or more end users to the one or more destination locations.

26. The computationally-implemented system of claim 22, wherein identifying one or more transportation vehicle units for transporting the one or more end users to one or more destination locations based, at least in part, on ascertaining that the one or more transportation vehicle units have one or more package delivery obligations for delivering one or more packages that will not violate one or more requirements for transporting the one or more end users comprises:

identifying one or more transportation vehicle units for transporting the one or more end users to one or more destination locations based, at least in part, on ascertaining that the one or more transportation vehicle units have one or more packages for delivery to one or more delivery locations that are along or proximate to a direct route to the one or more destination locations from a rendezvous location where the one or more end users rendezvous with the one or more transportation vehicle units in order to be transported to the one or more destination locations.

27. The computationally-implemented system of claim 26, wherein identifying one or more transportation vehicle units for transporting the one or more end users to one or more destination locations based, at least in part, on ascertaining that the one or more transportation vehicle units have one or more packages for delivery to one or more delivery locations that are along or proximate to a direct route to the one or more destination locations from a rendezvous location where the one or more end users rendezvous with the one or more transportation vehicle units in order to be transported to the one or more destination locations comprises:

identifying one or more transportation vehicle units for transporting the one or more end users to one or more destination locations based, at least in part, on ascertaining that the one or more transportation vehicle units have one or more packages for delivery to one or more delivery locations that are along or proximate to a direct route that is the shortest distance route to the one or more destination locations from the rendezvous location.

28. The computationally-implemented system of claim 26, wherein identifying one or more transportation vehicle units for transporting the one or more end users to one or more destination locations based, at least in part, on ascertaining that the one or more transportation vehicle units have one or more packages for delivery to one or more delivery locations that are along or proximate to a direct route to the one or more destination locations from a rendezvous location where the one or more end users rendezvous with the one or more transportation vehicle units in order to be transported to the one or more destination locations comprises:

identifying one or more transportation vehicle units for transporting the one or more end users to one or more destination locations based, at least in part, on ascertaining that the one or more transportation vehicle units have one or more packages for delivery to one or more delivery locations that are along or proximate to a direct route that is the most time efficient route to the one or more destination locations from the rendezvous location.

29. The computationally-implemented system of claim 26, wherein identifying one or more transportation vehicle units for transporting the one or more end users to one or more destination locations based, at least in part, on ascertaining that the one or more transportation vehicle units have one or more packages for delivery to one or more delivery locations that are along or proximate to a direct route to the one or more destination locations from a rendezvous location where the one or more end users rendezvous with the one or more transportation vehicle units in order to be transported to the one or more destination locations comprises:

identifying one or more transportation vehicle units for transporting the one or more end users to one or more destination locations based, at least in part, on ascertaining that the one or more transportation vehicle units have one or more packages for delivery to one or more delivery locations that do not add more than a predefined amount of time to the total amount of time it would have taken to transport the one or more end users to the one or more destination locations using the direct route and when no packages are being delivered during the transport of the one or more end users to the one or more destination locations.

30. The computationally-implemented system of claim 2, wherein identifying one or more transportation vehicle units for transporting the one or more end users to one or more destination locations based, at least in part, on determining whether the one or more transportation vehicle units have one or more package delivery obligations comprises:

determining that the one or more end users satisfies one or more driver preferences of one or more drivers of the one or more transportation vehicle units related to one or more preferences for one or more specified end user characteristics.

31. The computationally-implemented system of claim 30, wherein determining that the one or more end users satisfies one or more driver preferences of one or more drivers of the one or more transportation vehicle units related to one or more preferences for one or more specified end user characteristics comprises:

determining that the one or more end users satisfies one or more driver preferences of the one or more drivers that the one or more end users to be transported by the one or more transportation vehicle units are not member or members of a group of one or more end users who have been identified as being banned by the one or more drivers.

32. The computationally-implemented system of claim 2, wherein transmitting one or more directives that direct the one or more transportation vehicle units to rendezvous with the one or more end users in order to transport the one or more end users to the one or more destination locations comprises:

transmitting the one or more directives to one or more transport computing devices associated with the one or more transportation vehicle units.

33. The computationally-implemented system of claim 2, wherein transmitting one or more directives that direct the one or more transportation vehicle units to rendezvous with the one or more end users in order to transport the one or more end users to the one or more destination locations comprises:
    transmitting the one or more directives that direct the one or more transportation vehicle units to rendezvous with the one or more end users by transmitting one or more directives that identify at least one rendezvous location for the one or more transportation vehicle units to rendezvous with the one or more end users.

34. The computationally-implemented system of claim 2, wherein transmitting one or more directives that direct the one or more transportation vehicle units to rendezvous with the one or more end users in order to transport the one or more end users to the one or more destination locations comprises:
    transmitting the one or more directives that direct the one or more transportation vehicle units to rendezvous with the one or more end users including image data that identifies at least one of the one or more end users.

35. The computationally-implemented system of claim 2, wherein transmitting one or more directives that direct the one or more transportation vehicle units to rendezvous with the one or more end users in order to transport the one or more end users to the one or more destination locations comprises:
    transmitting the one or more directives that direct the one or more transportation vehicle units to rendezvous with the one or more end users including one or more directives that direct the one or more transportation vehicle units to deliver one or more packages during transport of the one or more end users.

36. The computationally-implemented system of claim 35, wherein transmitting the one or more directives that direct the one or more transportation vehicle units to rendezvous with the one or more end users including one or more directives that direct the one or more transportation vehicle units to deliver one or more packages during transport of the one or more end users comprises:
    transmitting the one or more directives that direct the one or more transportation vehicle units to deliver the one or more packages during transport of the one or more end users by transmitting one or more directives that identify the one or more packages to be delivered during the transport of the one or more end users.

37. The computationally-implemented system of claim 35, wherein transmitting the one or more directives that direct the one or more transportation vehicle units to rendezvous with the one or more end users including one or more directives that direct the one or more transportation vehicle units to deliver one or more packages during transport of the one or more end users comprises:
    transmitting the one or more directives that direct the one or more transportation vehicle units to deliver the one or more packages during transport of the one or more end users by transmitting one or more directives that identify specific route or routes for delivering the one or more packages to be delivered during the transport of the one or more end users.

38. The computationally-implemented system of claim 35, wherein transmitting the one or more directives that direct the one or more transportation vehicle units to rendezvous with the one or more end users including one or more directives that direct the one or more transportation vehicle units to deliver one or more packages during transport of the one or more end users comprises:
    transmitting the one or more directives that direct the one or more transportation vehicle units to deliver the one or more packages during transport of the one or more end users by transmitting one or more directives that identify one or more routes for delivering the one or more packages and for transporting the one or more end users to the one or more destination locations.

39. The computationally-implemented system of claim 2, further comprising one or more instructions that, when implemented in the at least one computing device, program the at least one computing device for:
    receiving, from an online retailer, a package delivery request for delivery of a package associated with a sale by the online retailer.

40. The computationally-implemented system of claim 2, further comprising one or more instructions that, when implemented in the at least one computing device, program the at least one computing device for:
    tracking a package delivery obligation.

41. The computationally-implemented system of claim 2, further comprising one or more instructions that, when implemented in the at least one computing device, program the at least one computing device for:
    receiving package delivery preference data that indicates at least one user preference associated with delivery of a package.

42. An article of manufacture, comprising:
    a non-transitory storage medium bearing:
    one or more instructions for receiving a request for transporting one or more end users;
    one or more instructions for identifying one or more transportation vehicle units for transporting the one or more end users to one or more destination locations based, at least in part, on determining whether the one or more transportation vehicle units have one or more package delivery obligations; and
    one or more instructions for transmitting one or more directives that direct the one or more transportation vehicle units to rendezvous with the one or more end users in order to transport the one or more end users to the one or more destination locations.

\* \* \* \* \*